(12) United States Patent
Minakawa et al.

(10) Patent No.: US 12,254,428 B2
(45) Date of Patent: Mar. 18, 2025

(54) TIMETABLE CREATION APPARATUS, TIMETABLE CREATION METHOD, AND AUTOMATIC VEHICLE CONTROL SYSTEM

(71) Applicant: Hitachi, Ltd., Tokyo (JP)

(72) Inventors: Tsuyoshi Minakawa, Tokyo (JP); Keiji Kimura, Tokyo (JP); Michi Kariatsumari, Tokyo (JP); Masahito Kokubo, Tokyo (JP); Megumi Yamaguchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 112 days.

(21) Appl. No.: 17/438,784

(22) PCT Filed: Feb. 21, 2020

(86) PCT No.: PCT/JP2020/007095
§ 371 (c)(1),
(2) Date: Sep. 13, 2021

(87) PCT Pub. No.: WO2020/217686
PCT Pub. Date: Oct. 29, 2020

(65) Prior Publication Data
US 2022/0188725 A1    Jun. 16, 2022

(30) Foreign Application Priority Data

Apr. 25, 2019   (JP) .................................. 2019-084599

(51) Int. Cl.
*G06Q 10/0631*    (2023.01)
*G06N 3/12*    (2023.01)

(52) U.S. Cl.
CPC ......... *G06Q 10/06311* (2013.01); *G06N 3/12* (2013.01)

(58) Field of Classification Search
CPC .... G06Q 10/06311; G06N 3/12; B61L 27/14; B61L 27/16; B61L 27/12
See application file for complete search history.

(56) References Cited

U.S. PATENT DOCUMENTS 9,434,398 B2 *   9/2016   Lucisano ................. B61D 3/16
9,744,981 B2 *   8/2017   Niinomi .................. B61L 27/16
(Continued)

FOREIGN PATENT DOCUMENTS

| CN | 106485912 A | 3/2017 |
|---|---|---|
| JP | 6-171512 A | 6/1994 |

(Continued)

OTHER PUBLICATIONS

Tang, Jinjun; A Data-Driven Timetable Optimization of Urban Bus Line Based on Multi-Objective Genetic Algorithm, Apr. 2021, IEEE Transactions on Intelligent Transportation Systems, vol. 22 No. 4, 2417-2429 (Year: 2021).*

(Continued)

*Primary Examiner* — Dylan C White
(74) *Attorney, Agent, or Firm* — Crowell & Moring LLP

(57) ABSTRACT

A timetable creation apparatus 100 for correcting a target timetable being a train timetable to be used to control a group of trains by using a predicted passenger demand to thereby create a new target timetable, includes: an objective function generation unit 115 that generates an objective function for an operation headway between trains included in the group of trains by using the predicted passenger demand; a constraint condition generation unit 117 that derives constraint conditions which an arrival time and a departure time of each of the trains at each of stations should satisfy for operation of the group of trains; and a candidate timetable creation unit 119 that creates a candidate timetable as an update candidate for a target timetable by using an arrival time and a departure time of each of the trains at each (Continued)

of the stations derived by optimizing the objective function under the constraint conditions.

14 Claims, 24 Drawing Sheets

(56) References Cited

U.S. PATENT DOCUMENTS

| | | | |
|---|---|---|---|
| 11,600,180 B2* | 3/2023 | Kamiya | G08G 1/127 |
| 12,157,509 B2* | 12/2024 | Vujanic | B61L 27/20 |
| 2012/0085871 A1* | 4/2012 | Chun | B61L 27/16 |
| | | | 701/19 |
| 2012/0197466 A1* | 8/2012 | Yoshimoto | B61L 27/04 |
| | | | 701/19 |
| 2015/0360706 A1* | 12/2015 | Niinomi | B61L 27/12 |
| | | | 701/19 |
| 2019/0228358 A1 | 7/2019 | Ootsuka et al. | |
| 2020/0027347 A1* | 1/2020 | Zhong | G06Q 50/40 |
| 2020/0357091 A1* | 11/2020 | Minakawa | G06Q 10/063 |
| 2021/0142670 A1* | 5/2021 | Kamiya | G08G 1/127 |
| 2022/0289260 A1* | 9/2022 | Indre | B61L 27/10 |
| 2022/0348242 A1* | 11/2022 | Vujanic | B61L 27/20 |
| 2023/0417561 A1* | 12/2023 | Dandl | G06Q 10/0631 |

FOREIGN PATENT DOCUMENTS

| | | |
|---|---|---|
| JP | 7-186962 A | 7/1995 |
| JP | 7-285439 A | 10/1995 |
| JP | 7-315222 A | 12/1995 |
| JP | 9-76912 A | 3/1997 |
| JP | 9-123913 A | 5/1997 |
| JP | 2003-154939 A | 5/2003 |
| JP | 2007-15424 A | 1/2007 |
| JP | 2009-78714 A | 4/2009 |
| JP | 2014-233989 A | 12/2014 |
| JP | 2015-184779 A | 10/2015 |
| WO | WO 2011/125613 A1 | 10/2011 |
| WO | WO-2016143606 A1 * | 9/2016 |
| WO | WO 2018/087811 A1 | 5/2018 |
| WO | WO 2019/078025 A1 | 4/2019 |

OTHER PUBLICATIONS

Extended European Search Report issued in European Application No. 20795929.7 dated Dec. 16, 2022 (eight (8) pages).

Hassannayebi, E. et al., "Optimizing headways for urban rail transit services using adaptive particle swarm algorithms", Public Transport, Apr. 18, 2017, pp. 23-62, vol. 10, No. 1, Springer, Berlin/Heidelberg, Germany, XP036497203 (40 pages).

International Search Report (PCT/ISA/210) issued in PCT Application No. PCT/JP2020/007095 dated May 19, 2020 with English translation (five (5) pages).

Japanese-language Written Opinion (PCT/ISA/237) issued in PCT Application No. PCT/JP2020/007095 dated May 19, 2020 (four (4) pages).

Australian Examination Report issued in Australian Application No. 2020260780 dated Sep. 14, 2022 (six 6) pages).

Wang Y., et al., "Real-Time Scheduling for Single Lines in Urban Rail Transit Systems", 2013 IEEE International Conference on Intelligent Rail Transportation (ICIRT), Aug. 2013 (six (6) pages).

Hassannayebi E., et al., "Demand-oriented timetable design for urban rail transit under stochastic demand", Journal of Industrial and Systems Engineering, Jul. 2016, pp. 28-56, vol. 9, No. 3 (29 pages).

Japanese-language Office Action issued in Japanese Application No. 2019-084599 dated Sep. 13, 2022 with English translation (nine (9) pages).

* cited by examiner

PATTERN MATCHING INFORMATION

| TRAIN ID | ROUTE ID | PREVIOUS OPERATION TRAIN ID | SUBSEQUENT OPERATION TRAIN ID | TRAIN ATTRIBUTE |
|---|---|---|---|---|
| PTR001 | RT011 | PTR004 | PTR002 | CHANGE TARGET |
| PTR002 | RT022 | PTR001 | PTR008 | CHANGE TARGET |
| PTR003 | RT032 | PTR005 | PTR007 | CHANGE TARGET |
| PTR004 | RT002 | — | PTR001 | OPERATION CONNECTION |
| PTR005 | RT031 | — | PTR003 | OPERATION CONNECTION |
| PTR006 | RT002 | — | — | PRECEDING TRAIN |
| PTR007 | RT021 | PTR003 | — | OPERATION CONNECTION |
| PTR008 | RT011 | PTR002 | — | OPERATION CONNECTION |

| ARRIVAL-DEPARTURE PLATFORM PRECEDING TRAIN (1) | BETWEEN-ADJACENT-STATIONS PRECEDING TRAIN (1) | ARRIVAL-DEPARTURE PLATFORM PRECEDING TRAIN (2) | BETWEEN-ADJACENT-STATIONS PRECEDING TRAIN (2) | ... |
|---|---|---|---|---|
| PTR004 | PTR005 | PTR005 | PTR005 | ... |
| PTR001 | PTR003 | PTR003 | PTR003 | ... |
| PTR005 | PTR006 | PTR006 | PTR006 | ... |
| — | — | — | — | ... |
| — | — | — | — | ... |
| — | — | — | — | ... |
| PTR003 | — | — | — | ... |
| PTR002 | PTR007 | PTR007 | PTR007 | ... |

FIG. 4

OPERATION ROUTE INFORMATION 1200

| ROUTE ID | STATION ID | PLATFORM ID | STOPPAGE CLASSIFICATION |
|---|---|---|---|
| RT001 | ST01 | #1 | STOP |
| RT001 | ST02 | #1 | STOP |
| RT001 | ST03 | #1 | STOP |
| RT001 | ST04 | #1 | STOP |
| RT001 | ST05 | #1 | STOP |
| RT002 | ST05 | #1 | STOP |
| RT002 | ST04 | #2 | STOP |
| RT002 | ST03 | #2 | STOP |
| RT002 | ST02 | #2 | STOP |
| RT002 | ST01 | #1 | STOP |
| RT003 | ST01 | #1 | STOP |
| RT003 | ST02 | #1 | STOP |
| RT003 | ST03 | #1 | STOP |
| RT003 | PK03 | #1 | STOP |
| RT004 | PK03 | #1 | STOP |
| RT004 | ST03 | #2 | STOP |
| RT004 | ST02 | #2 | STOP |
| RT004 | ST01 | #2 | STOP |
| RT005 | ST01 | #2 | STOP |
| RT005 | ST02 | #1 | PASS |
| ... | ... | ... | ... |

FIG. 5

CHANGED TRAIN GROUP INFORMATION — 904

| TRAIN ID (9041) | ROUTE ID (9042) | PREVIOUS OPERATION TRAIN ID (9043) | SUBSEQUENT OPERATION TRAIN ID (9044) |
|---|---|---|---|
| PTR101 | RT003 | PTR004 | PTR102 |
| PTR102 | RT004 | PTR101 | PTR007 |
| PTR103 | RT022 | PTR005 | PTR008 |

| ARRIVAL-DEPARTURE PLATFORM PRECEDING TRAIN (1) (9045) | BETWEEN-ADJACENT-STATIONS PRECEDING TRAIN (1) (9046) | ARRIVAL-DEPARTURE PLATFORM PRECEDING TRAIN (2) (9045) | BETWEEN-ADJACENT-STATIONS PRECEDING TRAIN (2) (9046) | ... |
|---|---|---|---|---|
| PTR004 | PTR005 | PTR005 | PTR005 | ... |
| PTR101 | — | PTR006 | PTR006 | ... |
| PTR005 | PTR006 | PTR006 | PTR006 | ... |

FIG. 7

EVALUATION INDEX VECTOR 500

511 513 515 517

510
- AVERAGE_CNGSTN_RATE( 6:00, 7:00, LN01, ST02 )
- AVERAGE_CNGSTN_RATE ( 6:20, 7:20, LN01, ST02 )
- AVERAGE_CNGSTN_RATE ( 6:40, 7:40, LN01, ST02 )
  ⋮
- AVERAGE_CNGSTN_RATE( 6:00, 7:00, LN01, ST04 )
- AVERAGE_CNGSTN_RATE ( 6:20, 7:20, LN01, ST04 )
- AVERAGE_CNGSTN_RATE ( 6:40, 7:40, LN01, ST04 )
  ⋮
- AVERAGE_CNGSTN_RATE( 6:00, 7:00, LN02, ST02 )
- AVERAGE_CNGSTN_RATE ( 6:20, 7:20, LN02, ST02 )
- AVERAGE_CNGSTN_RATE ( 6:40, 7:40, LN02, ST02 )
  ⋮
- AVERAGE_CNGSTN_RATE( 6:00, 7:00, LN02, ST04 )
- AVERAGE_CNGSTN_RATE ( 6:20, 7:20, LN02, ST04 )
- AVERAGE_CNGSTN_RATE ( 6:40, 7:40, LN02, ST04 )
  ⋮

521 523 525 527

520
- NUM_PSSNGR_UtB ( 6:00, 7:00, LN01, ST02 )
- NUM_PSSNGR_UtB ( 6:20, 7:20, LN01, ST02 )
- NUM_PSSNGR_UtB ( 6:40, 7:40, LN01, ST02 )
  ⋮
- NUM_PSSNGR_UtB ( 6:00, 7:00, LN01, ST04 )
- NUM_PSSNGR_UtB ( 6:20, 7:20, LN01, ST04 )
- NUM_PSSNGR_UtB ( 6:40, 7:40, LN01, ST04 )
  ⋮
- NUM_PSSNGR_UtB ( 6:00, 7:00, LN02, ST02 )
- NUM_PSSNGR_UtB ( 6:20, 7:20, LN02, ST02 )
- NUM_PSSNGR_UtB ( 6:40, 7:40, LN02, ST02 )
  ⋮
- NUM_PSSNGR_UtB ( 6:00, 7:00, LN02, ST04 )
- NUM_PSSNGR_UtB ( 6:20, 7:20, LN02, ST04 )
- NUM_PSSNGR_UtB ( 6:40, 7:40, LN02, ST04 )
  ⋮

FIG. 10

TIMETABLE CREATION APPARATUS, TIMETABLE CREATION METHOD, AND AUTOMATIC VEHICLE CONTROL SYSTEM

TECHNICAL FIELD

The present invention relates to a timetable creation apparatus, a timetable creation method, and an automatic vehicle control system.

BACKGROUND ART

Incorporation by Reference

This application is based upon and claims the benefit of priority to Japanese Patent Application No. 2019-084599 filed on Apr. 25, 2019, the entire contents of which are incorporated herein by reference.

To maintain passenger comfort in public transportation as represented by a railroad transport service, it is necessary to keep track of the passenger demand (when, from where to where, and how many people are trying to travel). This is because an occupancy rate (congestion rate) of trains derived from the passenger demand and a train timetable (while the term "timetable" in the field of railroads represents a train operation plan and a train operation diagram illustrating it in the form of a diagram, "timetable" herein is used to represent the former, i.e., the train operation plan) affects the passenger comfort. For example, in the case of railroads, as the occupancy rate of a train increases, discomfort increases in terms of personal space, and also passengers take a longer time to get on or off at stops, so that the train tends to delay. This may lead to inconvenience such as a failure to arrive at a destination at a planned time. On the other hand, in the case of focusing only on lowering the congestion rate and idly increasing the number of trains to provide an excess transport capacity, the service cost rises, which may lead to a disadvantage for passengers via a rise in transportation charge or the like.

Given such circumstances, PTL 1 and PTL 2 disclose techniques aimed at providing a transport capacity matching the passenger demand, which can vary over time. In the technique disclosed in PTL 1, a transport capacity matching the demand in each time period is provided by: calculating an appropriate number of trains based on a predicted demand in a representative section of a target railroad line in each time period; comparing the calculated appropriate number of trains and the actual number of trains currently in operation with each other; increasing the turnaround time to lower the operation density if the actual number of trains is larger than the appropriate number of trains; and decreasing the turnaround time to raise the operation density if the actual number of trains is smaller than the appropriate number of trains. Also, in the technique disclosed in PTL 2, a transport capacity matching the demand in each time period is provided by automatically determining the number of trains in the same railroad line in each time period based on the maximum number of passengers in each inter-station section under a condition that changing a turnaround station is allowed, and generating a train timetable such that the departure times at predetermined stations are at equal time intervals.

CITATION LIST

Patent Literature

[PTL 1] Japanese Patent Application Publication No. Hei 9-123913
[PTL 2] Japanese Patent Application Publication No. Hei 9-76912

SUMMARY OF INVENTION

Technical Problems

The techniques disclosed in PTL 1 and PTL 2 adjust the number of trains to be operated in each time period with the passenger demand taken into account but cannot provide a sufficient adjustment in situations as below, for example, so that the degree of match with the passenger demand is not uniform. One example is a situation where it is physically impossible to implement an ideal state for matching the passenger demand, such as when there are not enough vehicles available. Another example is a situation where the pattern of the railroad line where trains are operated is not simple. Examples thereof include a situation where a railroad line in charge of one course and a railroad line in charge of another course form a Y-shaped track layout in some section where they share the same track or platform and the allocation of (physical) vehicles to the trains in each course is appropriately determined according to a train timetable in an attempt to enhance the operation efficiency, and also a situation where the impact of an increase or decrease in operation headway spreads to both the forward side and the backward side, as in a loop line. If the degree of match with the passenger demand is not uniform, there can be inequality in passenger comfort between trains running in close time periods, such as, for example, "the congestion rate of one train is extremely high but there are only few passengers on the next train".

The present invention has been made in view of such circumstances, and an object thereof is to provide a timetable creation apparatus, a timetable creation method, and an automatic vehicle control system capable of providing a train operation service to passengers with a uniform quality even when the passenger demand varies.

Solution to Problems

An aspect of the present invention to solve the above issues is a timetable creation apparatus for correcting a target timetable being a train timetable to be used to control a group of vehicles by using a predicted passenger demand to thereby create a new target timetable, comprising: an objective function generation unit that generates an objective function for an operation headway between vehicles included in the group of vehicles by using the predicted passenger demand; a constraint condition generation unit that derives constraint conditions which an arrival time and a departure time of each of the vehicles at each of stations should satisfy for operation of the group of vehicles to be operable; and a candidate timetable creation unit that creates a candidate timetable as a candidate for a target timetable by using an optimum value of an arrival time and an optimum value of a departure time of each of the vehicles at each of the stations derived by optimizing the objective function under the constraint conditions, wherein the timetable creation apparatus outputs the candidate timetable created by the candidate timetable creation unit as a new target timetable.

Another aspect of the present invention is an automatic vehicle control system comprising: a timetable creation apparatus which includes an objective function generation unit that generates an objective function for an operation headway between vehicles included in a group of vehicles being control targets by using a predicted passenger demand calculated based on information obtained from a predetermined sensor, a constraint condition generation unit that derives constraint conditions which an arrival time and a departure time of each of the vehicles at each of stations should satisfy for operation of the group of vehicles to be operable, and a candidate timetable creation unit that creates a candidate timetable as a candidate for a target timetable being a train timetable to be used to control the group of vehicles, by using an optimum value of an arrival time and an optimum value of a departure time of each of the vehicles at each of the stations derived by optimizing the objective function under the constraint conditions, and which outputs the candidate timetable created based on a latest target timetable by the candidate timetable creation unit as a new target timetable; and a traffic management system which controls each of the vehicles based on the output target timetable.

Advantageous Effect of Invention

According to the present invention, it is possible to provide a train operation service to passengers with a uniform quality even when the passenger demand varies.

BRIEF DESCRIPTION OF DRAWINGS

FIG. 4 is a diagram explaining contents of pattern matching information 901 in the timetable change pattern illustrated in FIG. 3.

FIG. 5 is a diagram explaining contents of operation route information held in data for operation prediction included in the target timetable creation apparatus illustrated in FIG. 2.

FIG. 7 is a diagram explaining contents of changed train group information 904 in the timetable change pattern illustrated in FIG. 3.

FIG. 10 is a diagram explaining contents of an evaluation index vector calculated by the target timetable creation apparatus illustrated in FIG. 2 in the target timetable correction necessity determination process illustrated in FIG. 9.

DESCRIPTION OF EMBODIMENTS

First Embodiment

Figure 11:
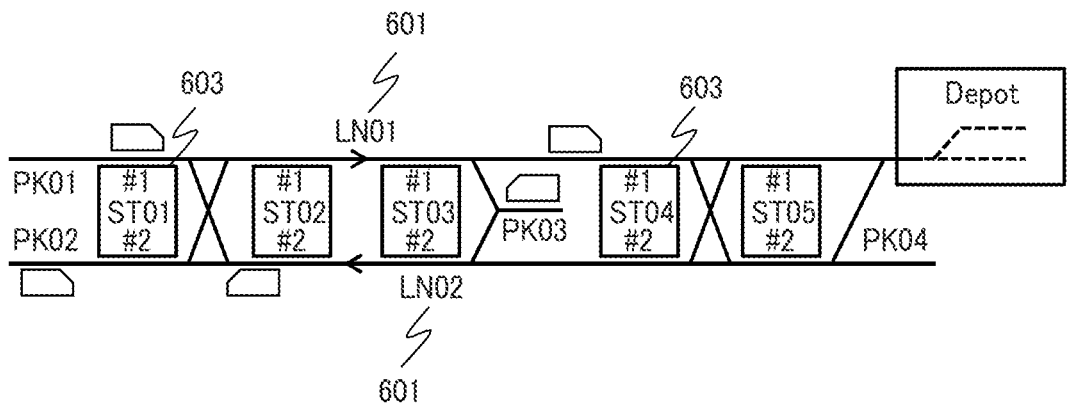
FIG. 11 is a diagram illustrating an example of a railroad line to which the first embodiment is preferably applicable.

Hereinbelow, a first embodiment of the present invention will be described by using FIGS. 1 to 22. This embodiment is an example preferably applicable to a simple linear railroad line as illustrated in FIG. 11 to be mentioned later, for example. In the following, for a simple description, the description will be given by taking, as an example, a case where trains are not distinguished between a local and an express train, the transport capacity (such as the passenger capacity per car and the number of cars per train set) is the same for all trains, and all trains stop at every station. However, embodiments of the present invention are not limited to this.

An automatic train control system in this embodiment holds a train timetable serving as a target in train control (target timetable) and updates this target timetable based on information obtained from various sensors, such as running histories, so that a train operation service can be provided to passengers with a quality closer than otherwise to a reference service quality even when the situation changes. The automatic train control system is configured to include a target timetable creation apparatus that, when updating the target timetable, predicts a future situation of the train operation based on the information obtained from the various sensors and the current target timetable, creates a predicted timetable being a train timetable including the future situation of the train operation in addition to the situation of the train operation up to the present, figures out portions to be corrected in the target timetable based on this predicted timetable and a predicted passenger demand, and creates target timetables (candidate timetables) as candidates for a new target timetable that serve as correction proposals for each of these portions. For each of the candidate timetables created, the target timetable creation apparatus evaluates each train's predicted congestion rate or the like, and updates the target timetable with the best candidate timetable. In the creation of the candidate timetables, the target timetable creation apparatus, in addition to increasing or decreasing the number of trains, calculates a target operation headway of each train and performs an operation headway optimization process of bringing the operation headways in the train timetable close to the above operation headways.

Figure 1:
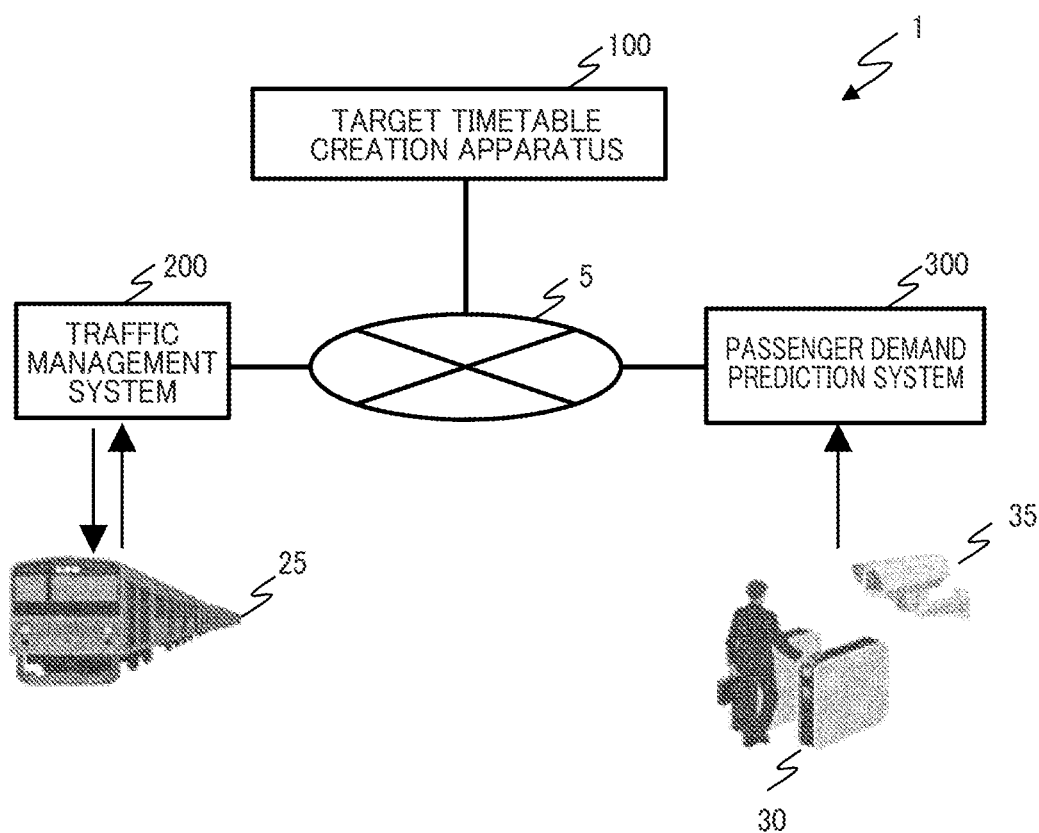
FIG. 1 is a block diagram of an automatic train control system according to a first embodiment.

FIG. 1 is a diagram explaining an example of the configuration of an automatic train control system 1 according to the first embodiment. The automatic train control system 1 includes a traffic management system 200, a passenger demand prediction system 300, and a target timetable creation apparatus 100. The target timetable creation apparatus 100 appropriately corrects a train timetable obtained from the traffic management system 200 and used as a control target in train control (target timetable) based on information obtained from the passenger demand prediction system 300 and indicating a passenger demand including a predicted future passenger demand (e.g., when, from where to where, and how many people are and will be traveling), and transmits the result to the traffic management system 200. The target timetable creation apparatus 100, the traffic management system 200, and the passenger demand prediction system 300 are coupled to one another in a communicable manner by a wired or wireless communication network 5, such as a LAN (Local Area Network), a WAN (Wide Area Network), the Internet, or dedicated lines, for example.

The traffic management system 200 manages the train timetable (target timetable), the train location of each train, and the like, and controls the running of each train 25 in an operation management area based on the information of the target timetable.

The passenger demand prediction system 300 predicts the passenger demand at and after the present time from passenger demand history information that has been accumulated up to the present and real-time sensor information. Examples of the real-time sensor information to be used by the passenger demand prediction system 300 include data having the absolute number of passengers as information, such as data obtained by counting representing the number of persons having passed ticket gates 30 at stations, information for estimating the ratio of persons getting on an up-train and persons getting on a down-train, such as videos captured with monitoring cameras 35 installed at platforms in a station, and so on. Note that the sensor information to be used by the passenger demand prediction system 300 is not limited to these. The passenger demand prediction system 300 may be configured to obtain information in tickets, commuter passes, and the like from IC card readers to obtain information on not only stations which passengers enter but also stations at destinations.

Figure 2:
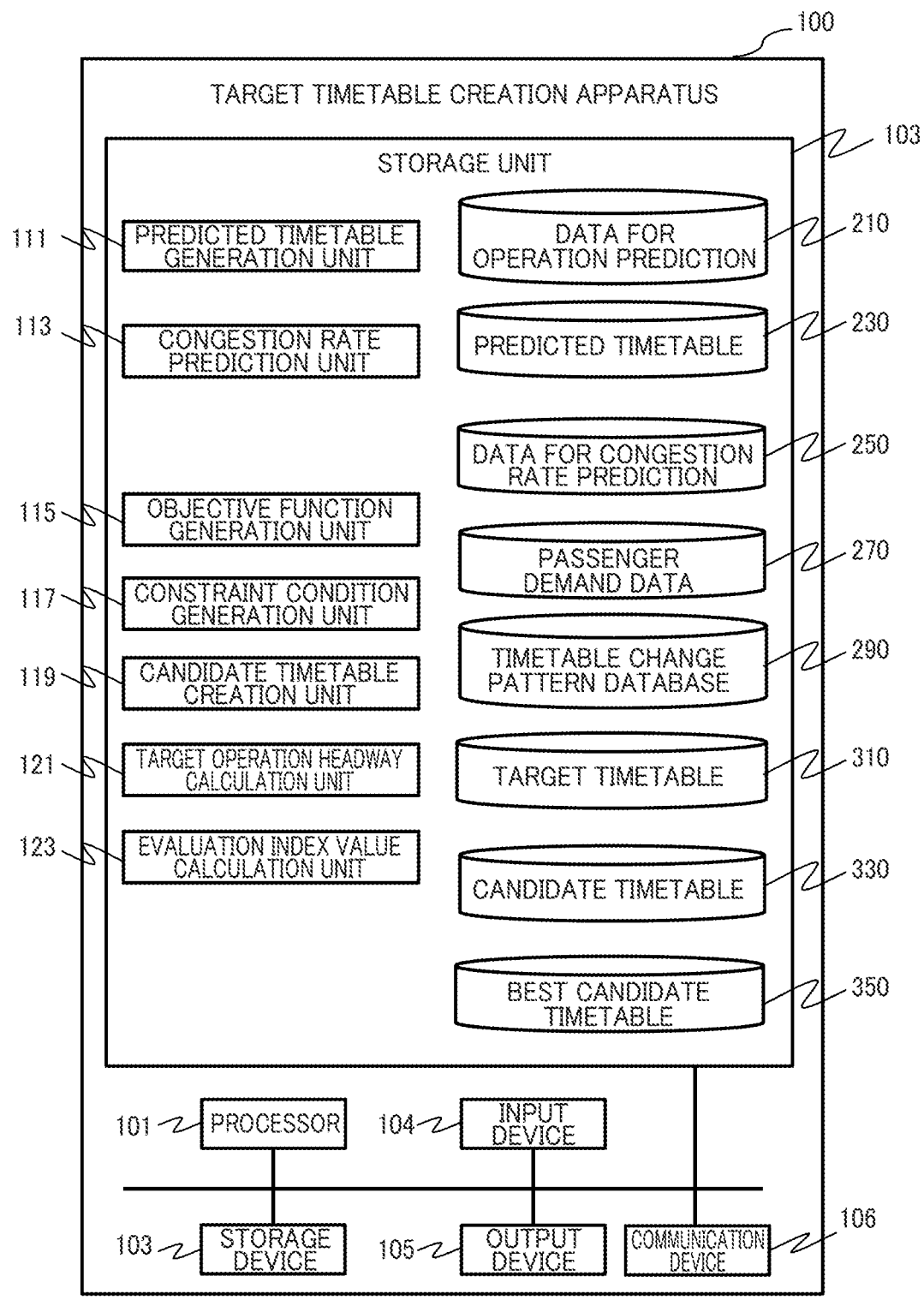
FIG. 2 is a diagram illustrating a configuration of a target timetable creation apparatus 100 according to the first embodiment.

FIG. 2 is a diagram explaining an example of the configuration of the target timetable creation apparatus 100. The target timetable creation apparatus 100 includes, as its hardware: a processor 101, such as a CPU (Central Processing Unit); a storage device 103, such as a RAM (Random Access Memory) and a ROM (Read Only Memory) or the like, and an HDD (Hard Disk Drive) or an SSD (Solid State Drive); an input device 104 including a keyboard, a mouse, a touchscreen, and/or the like; an output device 105 including a monitor (display) or the like; and a communication device 106 that communicates with apparatuses. Note that the traffic management system 200 and the passenger demand prediction system 300 have similar hardware configurations as well.

The target timetable creation apparatus 100 has the functions of a predicted timetable generation unit 111, a congestion rate prediction unit 113, an objective function generation unit 115, a constraint condition generation unit 117, a candidate timetable creation unit 119, a target operation headway calculation unit 121, and an evaluation index value calculation unit 123. These functions may be implemented by hardware such as FPGAs or implemented by a configuration in which the processor 101 reads out and executes a program stored in the storage device 103. Of these, the following assumes the latter, i.e., a configuration in which the processor 101 reads out and executes programs stored in the storage device 103. In a context where, for example, the target timetable creation apparatus 100 generates a predicted timetable 230 by using the predicted timetable generation unit 111 (predicted timetable generation program), expressions using the target timetable creation apparatus 100 as the actor, such as "the target timetable creation apparatus 100 generates a predicted timetable 230", and expressions such as "the predicted timetable generation unit 111 is executed to generate a predicted timetable 230" will also be used.

The predicted timetable generation unit 111 predicts a future operational situation of each train by using data for operation prediction 210 and a train timetable (e.g., a latest target timetable 310 obtained from the traffic management system 200) and, along with the running history of each train up to the present (past running history), generates a predicted timetable 230 being a train timetable predicted such that "the trains have operated this way so far and will operate this way in the future". Here, the predicted timetable generation unit 111 includes the running history of each train, which is past information, when generating the predicted timetable 230 so that the congestion rate prediction unit 113, when predicting the congestion rate, can take into account information on passengers who boarded in sections where the train has already run.

The congestion rate prediction unit 113 predicts the congestion rate of each train during its run between each pair of adjacent stations, by using the predicted timetable 230, data for congestion rate prediction 250, and passenger demand data 270. The congestion rate prediction unit 113 also predicts the number of left-behind passengers (i.e., passengers trying to board but failing to do so due to exceeding the passenger capacity) for each train at each station.

The objective function generation unit 115 is executed in step s115 in a later-described headway adjustment process s93 to create an objective function for headway adjustment based on target operation headways calculated by the target operation headway calculation unit 121.

The constraint condition generation unit 117 is executed in step s117 in the later-described headway adjustment process s93 to create constraint conditions for the running of trains which a feasible solution should satisfy.

The candidate timetable creation unit 119 is executed in step s57 in a later-described target timetable correction process s21 to create candidate timetables as candidates for a new target timetable that is more suitable for the current situation.

The target operation headway calculation unit 121 calculates ideal values of the operation headways for a group of headway adjustment target trains by using the passenger demand data 270, and is executed in step s113 in the later-described headway adjustment process s93 to calculate target operation headways.

The evaluation index value calculation unit 123 calculates the index values of predetermined evaluation indexes on train timetables, and is executed in step s35 in a later-described target timetable correction necessity determination process s17 and step s133 in a later-described candidate timetable selection process s61 to calculate an evaluation index vector. Note that the evaluation indexes are represented, for example, by a vector formed of a plurality of elements.

Further, as illustrated in FIG. 2, the target timetable creation apparatus 100 stores the data of the data for operation prediction 210, the predicted timetable 230, the data for congestion rate prediction 250, the passenger demand data 270, a timetable change pattern database 290, the target timetable 310, candidate timetables 330, and a best candidate timetable 350.

The data for operation prediction 210 is data to be used by the predicted timetable generation unit 111 and contains information on the stations and track equipment (e.g., information on the order of the stations of each railroad line and the track layout, information on usable platforms at each station, the running time of each train type between adjacent stations, the minimum headway and junction margin being the minimum times to be ensured between a preceding train and a subsequent train, etc.), the running history of each train, and so on.

The predicted timetable 230 is generated by the predicted timetable generation unit 111 and is a train timetable containing the running history of each train up to the present and, in addition, its future operational situation predicted such that "the train will operate this way in the future".

The data for congestion rate prediction 250 is data to be used by the congestion rate prediction unit 113 and contains, for example, information on the order of the stations of each railroad line and the travel routes from boarding stations to alighting stations, which include transfer stations, and information on passengers' behavior patterns (passenger behavior models).

The passenger demand data 270 is obtained by the passenger demand prediction system 300 and contains the passenger demand up to the present and also a predicted future passenger demand.

The timetable change pattern database 290 is data containing one or more timetable change patterns 291 (details will be described later). Each timetable change pattern 291 corresponds to the contents of train operation rescheduling for one or more trains, and contains information defining how to change constituent elements of a train timetable when changing the train timetable.

Each timetable change pattern 291 contains, for example, information on combination elements such as an increase/decrease in the number of trains and the running order of trains, and information for setting the headway adjustment target range. In this way, it is possible to define the contents of timetable changes corresponding, for example, to train operation rescheduling actions such as adding an extra train, suspending the train operation in the entire section or in some section, changing the destination of a train (including extension of operation, change of the course, temporary evacuation to a sidetrack, etc.), and adjusting the operation headways of trains, and to combinations of two or more of these train operation rescheduling actions.

Note that in this embodiment, a description will be given of an example in which the timetable change pattern database 290 is created and stored in a storage unit in advance as information containing one or more timetable change patterns 291, but embodiments of the present invention are not limited to this. An executable program capable of executing timetable change processes corresponding to the contents defined in the respective timetable change patterns 291 may be created and stored in advance. Details of the timetable change patterns 291 will be described later.

The target timetable 310 is the latest train timetable used in the traffic management system 200 as a target in train control, and is obtained from the traffic management system 200. The target timetable creation apparatus 100 corrects the target timetable 310 as needed and transmits it to the traffic management system 200.

The candidate timetables 330 are created in a timetable update process executed by the target timetable creation apparatus 100, and are train timetables as candidates for the corrected target timetable.

The best candidate timetable 350 is created in the timetable update process executed by the target timetable creation apparatus 100, and is a train timetable determined as the most appropriate for a predicted passenger demand among the candidate timetables.

Next, details of each timetable change pattern 291 contained in the timetable change pattern database 290 will be described using FIGS. 3 to 7.
(Timetable Change Patterns)

Figure 3:
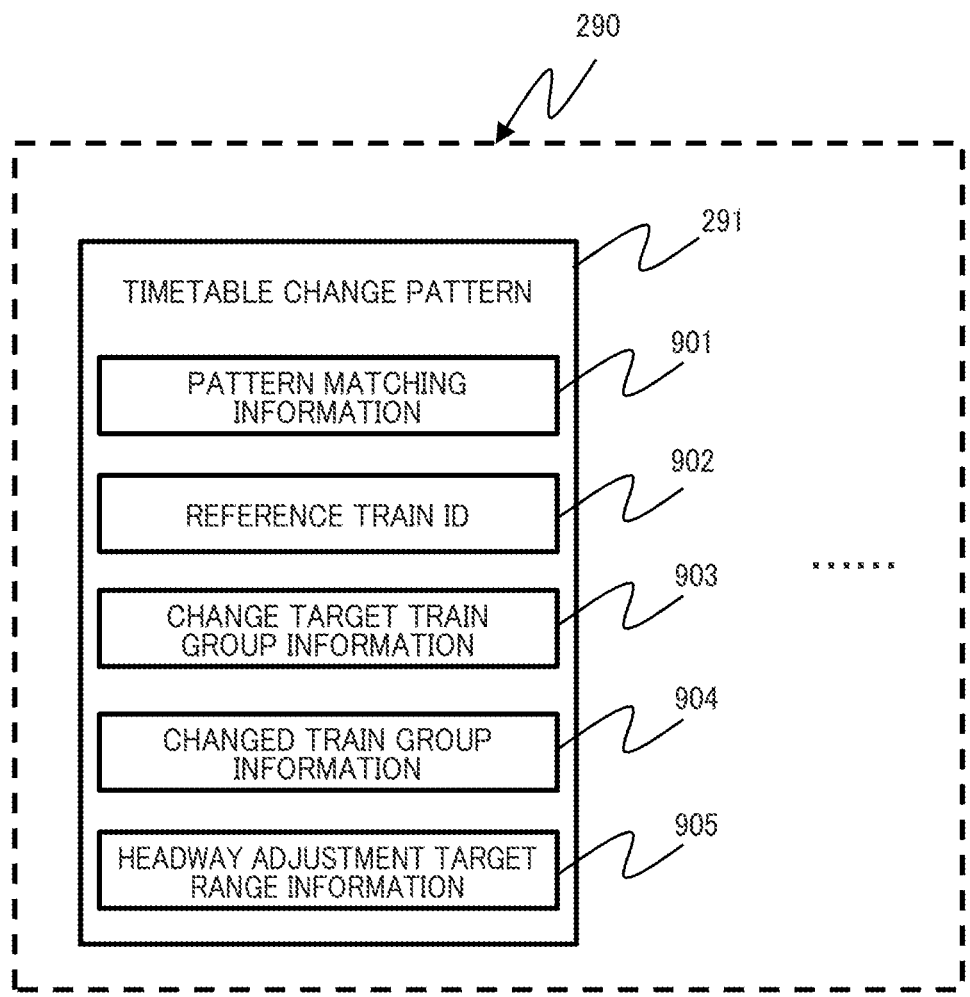
FIG. 3 is a diagram explaining a timetable change pattern held in a timetable change pattern database included in the target timetable creation apparatus illustrated in FIG. 2.

FIG. 3 is a diagram explaining an example of the configuration of a timetable change pattern 291. As illustrated in FIG. 3, each timetable change pattern 291 in this embodiment includes pattern matching information 901, a reference train ID 902, change target train group information 903, changed train group information 904, headway adjustment target range information 905.

In the pattern matching information 901, there is registered information which, with train IDs (identifiers of trains), identifies the state of a timetable before a timetable change. For example, in the pattern matching information 901, there is registered information which, with the train IDs, defines the combination elements of a timetable before a timetable change. Details of the pattern matching information 901 will be described later.

In the reference train ID 902, there is registered a train ID of a train related to a portion among the constituent elements of the change target train timetable whose contents need to be changed (violating portion). Based on the reference train ID 902, the target timetable creation apparatus 100 associates the train IDs in the timetable change pattern 291 and the train IDs in the candidate timetables with one another.

In this embodiment, the values of the train IDs used in the data of each train timetable (such as the target timetable, the predicted timetable, and the candidate timetables) and those of the train IDs in the timetable change pattern 291 are handled as different pieces of data, and their values do not necessarily match each other. This is because the timetable change pattern 291 is not created in association with specific individual train timetables (such as the target timetable, the predicted timetable, and the candidate timetables) but is defined as a generalized pattern (that is, to which trains in a specific individual target timetable one train in the timetable change pattern 291 corresponds can vary depending on the situation), and therefore the train IDs in the timetable change pattern 291 are defined as local train IDs in a closed timetable change pattern. In this embodiment, the target timetable creation apparatus 100 creates a train ID correspondence table in which the train IDs in the timetable change pattern 291 and the train IDs in a specific individual train timetable are associated in a one-to-one correspondence, and converts the train IDs in the timetable change pattern 291 into actual specific train IDs by referring to the created train ID correspondence table so that the local train IDs in the timetable change pattern 291 and the train IDs in the train timetable can be associated with one another according to the violating portion of interest. The train ID correspondence table generally varies by the violating portion of interest.

In the change target train group information 903, there is registered a list of train IDs of trains to be deleted due to the train timetable change (e.g., a list of train IDs of trains whose destinations are to be changed, whose running order is to be changed, or whose operations are to be suspended, for example).

The changed train group information 904 stores information on trains to be added for the train timetable change. This information is, for example, information indicating which train is to run in which route by using which train's vehicle and which train is to run as a preceding train. Details of the changed train group information 904 will be described later. By identifying elements in the train timetable other than times (such as which trains are to run in which routes, to which trains the same vehicle is to be allocated, and in what order the trains are to use resources such as tracks) as described above, it becomes easy to search for a train timetable change proposal that is actually usable (i.e., executable) in the train control.

The headway adjustment target range information 905 stores information identifying trains whose operation headways are to be adjusted in the later-described headway adjustment process s93. For example, in the case of "adjusting the headways of the trains in a train range from a preceding train Np to a subsequent train Ns with respect to a change target train or a newly added train", a set of "Np" and "Ns" is stored. Note that the train identifying information is not limited to this, and may be time-based information such as to, for example, "adjust the headways of the trains departing from a predetermined station from Tp seconds before a change target train or a newly added train to Ts seconds after it".

Now, details of the above-mentioned pattern matching information 901 will be described.
(Pattern Matching Information 901)

FIG. 4 is a diagram explaining contents of the pattern matching information 901 included in a timetable change pattern 291. The pattern matching information 901 is data defining information on each train before a timetable change, which represents a precondition for the timetable change. Each record in the pattern matching information 901 has items including a train ID 9011 storing a train ID, a route ID 9012, a previous operation train ID 9013, a subsequent operation train ID 9014, a train attribute 9015, arrival-departure platform preceding trains 9016, and between-adjacent-stations preceding trains 9017.

The train ID 9011 stores an identifier of a train (train ID) forming a train timetable. The route ID 9012 stores identification information that identifies the running route of the train with the train ID 9011 (route ID). Specific contents of the operation route indicated by the route ID are defined in operation route information (described later).

The previous operation train ID 9013 stores identification information on the train to which the vehicle used as the train with the train ID 9011 was allocated before the train with the train ID 9011 (previous operation train ID). The subsequent operation train ID 9014 is identification information on the train to which the vehicle used as the train with the train ID 9011 will be allocated after the train with the train ID 9011 (subsequent operation train ID). The train attribute 9015 stores information indicating a train attribute representing a role or the like of the train in the timetable change pattern. The train attribute includes, for example, "change target", "preceding train", or "operation connection".

"Change target" represents a train whose operation will change in response to a timetable change. Thus, if this train as "change target" is a train particularly restricted from being changed in a train timetable change (a train excluded from change targets), the timetable change pattern 291 for this train timetable change cannot be applied.

"Preceding train" represents a train that is not a change target and will be a preceding train in the case of uniquely determining a train timetable before or after a change excluding a difference in time (that is, in the case of uniquely determining which train is to use which train's vehicle to run in which route, and if there is a portion, such as an arrival-departure platform, that conflicts with the route of another train, uniquely determining which train is to run after the other train at this section). Thus, "preceding train" is a train only necessary for uniquely determining a train timetable before or after a change excluding a difference in time, and applying the timetable change pattern 291 will not change the timetable of this train. Hence, even when this train as "preceding train" is a train that is particularly restricted from being changed in a train timetable change (a train excluded from change targets), the timetable change pattern 291 for this train timetable change can still be applied.

"Operation connection" represents a train that is not "change target" and will be a previous operation train or a subsequent operation train in the case of uniquely determining a train timetable before or after a change excluding a difference in time (that is, in the case of uniquely determining which train is to use which train's vehicle to run in which route, and if there is a portion, such as an arrival-departure platform, that conflicts with the route of another train, uniquely determining which train is to run after the other train at this section). Thus, "operation connection" is a train only necessary for uniquely determining a train timetable before or after a change excluding a difference in time, and applying the timetable change pattern 291 will not change the timetable of this train. Hence, even when this train as "operation connection" is a train that is particularly restricted from being changed in a train timetable change (a train excluded from change targets), the timetable change pattern 291 for this train timetable change can still be applied.

Note that when the train attribute 9015 is "preceding train" or "operation connection" and information (train ID) does not need to be stored in the previous operation train ID 9013 or the subsequent operation train ID 9014, a predetermined exception value meaning "Don't Care" (e.g., "–") is registered in the previous operation train ID 9013 or the subsequent operation train ID 9014. Note that in this embodiment, as described above, the timetable change pattern 291 is not created in association with specific individual train timetables. Thus, in each timetable change pattern 291, the running routes and the running order of the trains are set, but their arrival-departure times are not set.

In the arrival-departure platform preceding trains 9016 and the between-adjacent-stations preceding trains 9017, with respect to the arrival-departure platforms and the tracks between the adjacent stations (between the station of interest and the station next thereto) to be used by the train identified by the train ID 9011 when it runs in the route identified by the route ID 9012, the train IDs of the trains that use the above arrival-departure platforms immediately before the above train, and the train IDs of the trains that use the above tracks between the adjacent stations immediately before the above train are respectively registered in the order of stations. Specifically, the information on the first station in the order of stations is registered as an arrival-departure platform preceding train 9016(1) and a between-adjacent-stations preceding train 9017(1), and the information on the second station is registered as an arrival-departure platform preceding train 9016(2) and a between-adjacent-stations preceding train 9017(2). Subsequently, pieces of information are registered up to the last station in the order of stations in a similar manner.

In other words, in each of the arrival-departure platform preceding trains 9016, with respect to the arrival-departure platform at a station which the train with the train ID 9011 arrives at and departs from, identification information on the train that uses this arrival-departure platform immediately before the above train (arrival-departure platform preceding train ID) is stored. Specifically, in the arrival-departure platform preceding trains 9016, train IDs are stored in the order of stations in which the train with the train ID 9011 runs (the arrival-departure platform preceding trains 9016 (1), (2) . . . ). For example, for the train whose train ID 9011 is "PTR003", the arrival-departure platform preceding train at the second station in the order of stations is "PTR006" described in the arrival-departure platform preceding train 9016(2).

In each of the between-adjacent-stations preceding trains 9017, with respect to the track between a station and the adjacent station to this station (i.e., the next station) to be used by the train with the train ID 9011 when it departs from the station, identification information on the train that uses the track immediately before the above train (between-adjacent-stations preceding train ID) is stored. Specifically, in the between-adjacent-stations preceding trains 9017, train IDs are stored in the order of stations in which the train with the train ID 9011 runs (the between-adjacent-stations preceding trains 9017(1), (2) . . . ).

Note that there is a case where the track layout is such that passing or single-track two-way running is impossible. In this case, the plurality of arrival-departure platforms for the arrival-departure platform preceding trains 9016 in each section where the preceding train does not change or the plurality of tracks to the next stations for the between-adjacent-stations preceding trains 9017 in the above section may be combined together and a single preceding train (train ID) may be registered for them, in order to reduce the amount of data. Alternatively, in the order of the stations for the train with the train ID 9011, the stations at which the preceding train changes and the respective preceding trains thereat may be paired and stored as pieces of variable-length data to reduce the amount of data.

Also, a predetermined exception value meaning "no preceding train" (e.g., "–") may be stored in the items of the arrival-departure platform preceding trains 9016 or the between-adjacent-stations preceding trains 9017 for each train that uses its platform first. Moreover, a predetermined exception value meaning "Don't Care" (e.g., "–") may be registered in the items of the arrival-departure platform preceding trains 9016 and the between-adjacent-stations preceding trains 9017 for each train registered only as "preceding train". The reason for the above is that these pieces of information are information not required in the creation of a train ID correspondence table.

Now, details of the operation route information related to the route IDs 9012 will be described.

(Operation Route Information)

FIG. 5 is a diagram explaining an example of the operation route information. Operation route information 1200 is information defining the physical routes in which trains run and operation patterns of the trains at each station in these routes such as whether the train stops or passes the station. The operation route information 1200 is created and stored in advance as part of the data for operation prediction 210.

As illustrated in the diagram, each record in the operation route information 1200 has items of a route ID 1201, a station ID 1203, a platform ID 1205, and a stoppage classification 1207. The route ID 1201 stores the route ID of an operation route. The station ID 1203 stores identification information identifying an individual station in the route with the route ID 1201 (station ID). The platform ID 1205 stores identification information identifying an individual arrival-departure platform (platform) in the station with the station ID 1203 (platform ID). The stoppage classification 1207 stores information indicating whether trains stop at or pass the station with the station ID 1203 (stoppage classification). The operation route information 1200 in the diagram stores the pieces of information in the order of route IDs and in chronological order for the same route ID. For example, a train that runs in a route "RT001" departs from an arrival-departure platform "#1" in a station "ST01", which is a starting station, stops at an arrival-departure platform "#1" in a station "ST02", then stops at an arrival-departure platform "#1" in a station "ST03", stops at an arrival-departure platform "#1" in a station "ST04", and thereafter terminates at an arrival-departure platform "#1" in a station "ST05".

Thus, the operation route information 1200 is information identifying the order of stations from a starting station through a terminal station, the arrival-departure platforms to be used, and the stoppage classification, and contains all train running patterns.

Note that when there are a plurality of choices for the track to be used between adjacent stations, such information may be contained in the operation route information 1200. Specifically, for example, an item related to identification information on the track on the departure side (departure-side track ID) is contained in each record in the operation route information 1200. In this case, a predetermined exception value is set in the item of the departure-side track ID in the record associated with the terminal station of the railroad line.

(Directed Graph)

In this embodiment, the target timetable creation apparatus 100 generates a directed graph based on the relationship among the trains described in each timetable change pattern 291, in order to generate a train ID correspondence table. This directed graph will be described below by using FIG. 6. Note that each timetable change pattern 291 is created and registered in the timetable change pattern database 290 in advance. When this advance preparation is performed, this directed graph can be used to also check the validity of the timetable change pattern 291 in a simple manner (in terms of necessary conditions). Thus, in a case of automatically creating each timetable change pattern with a separate tool or the like, it is desirable to employ a configuration that causes this tool to execute a validity check using the directed graph to be described with FIG. 6.

Figure 6:
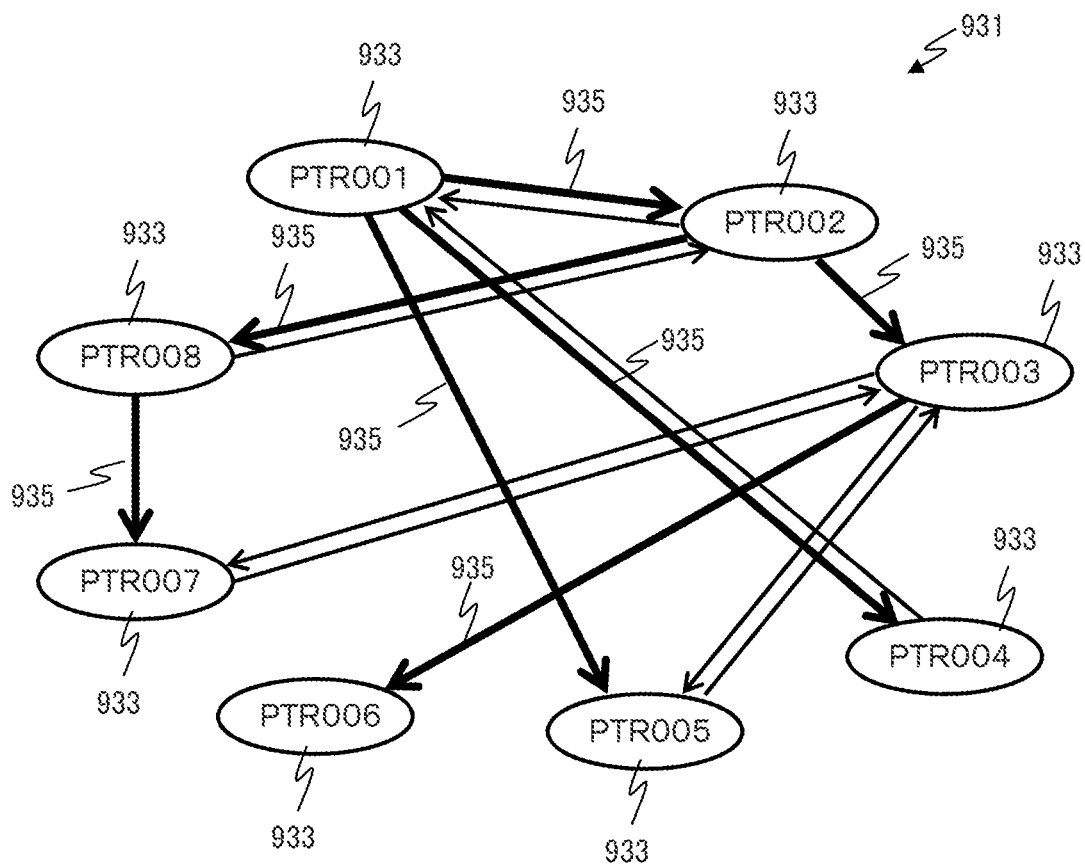
FIG. 6 is a diagram explaining contents of a directed graph created by the target timetable creation apparatus illustrated in FIG. 2 in order to derive a train ID correspondence table in a combination element reflection process in FIG. 16.

FIG. 6 is a diagram explaining an example of the directed graph to be used to generate a train ID correspondence table. A directed graph 931 illustrated in FIG. 6 is created such that the train IDs registered in the pattern matching information 901 are represented as nodes 933, and the relationship among the previous operation trains, the subsequent operation trains, and the preceding trains specified in the pattern matching information 901 are expressed with arcs (directed edges). Specifically, each of the nodes 933 corresponding to the respective trains (train IDs) is the origin of an arc(s), and the node(s) 933 corresponding to one(s) of the trains (train IDs) of the previous operation train, the subsequent operation train, the trains of the arrival-departure platform preceding trains, and the between-adjacent-stations preceding trains related to the above train is(are) the terminal of the arc(s).

In the case of using the directed graph 931 in a validity check of a timetable change pattern 291, the validity of, for example, its pattern matching information 901 and reference train ID 902 can be determined based on whether there are paths (sequences of nodes and arcs) extending from the node 933 with the reference train ID 902 ("PTR001") to the other nodes 933. In the example of FIG. 6, the nodes "PTR002" to "PTR008" can be reached from the node "PTR001" directly or via another node(s) by using bold arcs 935. Accordingly, the timetable change pattern 291 is determined as "valid". If the timetable change pattern 291 is determined as "not valid", then, for example the number of trains registered in the timetable change pattern 291 is increased and the timetable change pattern 291 is registered in the timetable change pattern database 290 so that the timetable change pattern 291 can be determined as "valid".

Next, details of the changed train group information 904 in each timetable change pattern 291 will be described.
(Changed Train Group Information 904)

FIG. 7 is a diagram illustrating an example of the changed train group information 904 in a timetable change pattern 291. The changed train group information 904 is information on a group of trains after a timetable change, and each record on each changed train timetable has items of a train ID 9041, a route ID 9042, a previous operation train ID 9043, a subsequent operation train ID 9044, arrival-departure platform preceding trains 9045, and between-adjacent-stations preceding trains 9046.

The train ID 9041 stores the train ID of a train to be newly added to the train timetable. Here, the train ID stored in the train ID 9041 is not associated with a train ID in a specific individual train timetable, but is a local train ID in the timetable change pattern.

The route ID 9042 stores identification information on the running route of the train with the train ID 9041 (route ID). The previous operation train ID 9043 stores a previous operation train ID related to the train with the train ID 9041. The subsequent operation train ID 9044 stores a subsequent operation train ID related to the train with the train ID 9041. The arrival-departure platform preceding trains 9045 store arrival-departure platform preceding train IDs related to the train ID 9041. The between-adjacent-stations preceding trains 9046 store between-adjacent-stations preceding train IDs related to the train ID 9041.

The timetable change pattern 291 described above is created manually or with a separate tool so as to satisfy conditions as below and stored in the timetable change pattern database 290 in advance.

The timetable change pattern 291 is created such that every train that is the previous operation train of a change target train and is not a change target train will be the previous operation train of one of changed trains. Also, the timetable change pattern 291 is created such that every train that is the subsequent operation train of a change target train and is not a change target train will be the subsequent operation train of one of the changed trains. Moreover, the timetable change pattern 291 is created such that all trains appearing in the timetable change pattern can be traced when the trains each being related as a preceding train, a previous operation train, or a subsequent operation train are recursively traced from the train identified by the reference train ID. These are necessary conditions for a train ID correspondence table to be uniquely created.

As long as the above conditions are satisfied, not all trains running in a given time period have to be included in the timetable change pattern. It is sufficient to include only the trains directly related to the timetable change and the trains related to those trains (such as their preceding trains, previous operation trains, and subsequent operation trains) in the timetable change pattern 291.

The functions of the target timetable creation apparatus 100 described above with FIGS. 1 to 7 are implemented by hardware of the target timetable creation apparatus 100 or by causing the processor 101 of the target timetable creation apparatus 100 to read out and execute respective programs stored in the storage device 103.

Also, these programs can be stored in a non-temporary data storage medium that is readable by an information processing device, such as a secondary storage device, a storage device such as a non-volatile semiconductor memory, a hard disk drive, or an SSD, an IC card, an SD card, or a DVD, for example.

Figure 8:
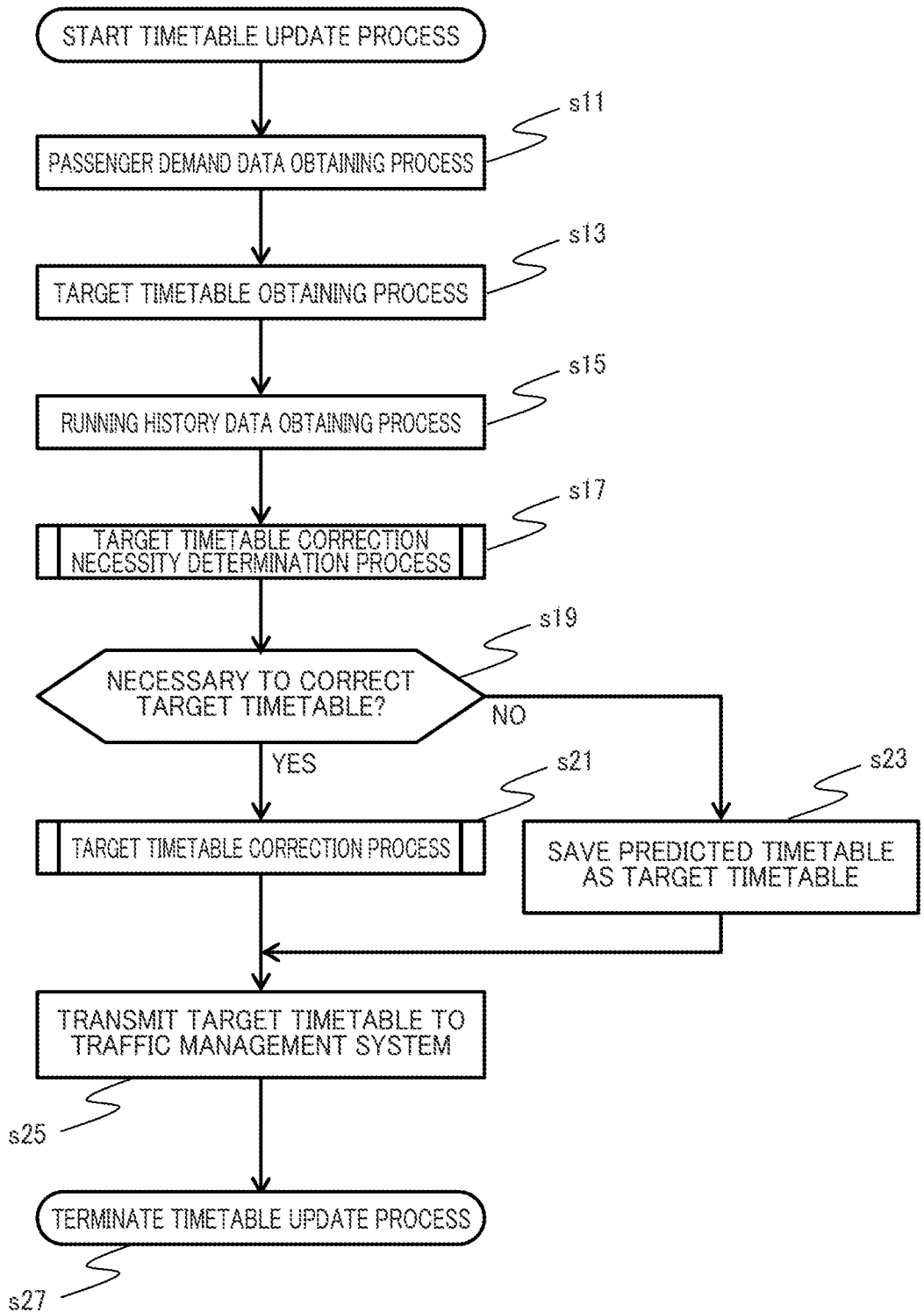
FIG. 8 is a flowchart explaining operations involved in a timetable update process among the operations of the target timetable creation apparatus illustrated in FIG. 2.

<<<Description of Processes>>>
Next, processes performed by the target timetable creation apparatus 100 will be described.
<<Timetable Update Process>>
FIG. 8 is a flowchart illustrating an example of the timetable update process performed by the target timetable creation apparatus 100. The timetable update process is a process that obtains a target timetable currently used in train control from the traffic management system 200, corrects the target timetable as necessary, and transmits it to the traffic management system 200. In response to receiving the target timetable transmitted from the target timetable creation apparatus 100, the traffic management system 200 updates the target timetable held therein so as to use the target timetable in the train control. The timetable update process is executed, for example, when a predetermined user input is given or with predetermined timing (e.g., at a predetermined time or at predetermined time intervals).

Upon start of the timetable update process, firstly, the target timetable creation apparatus 100 obtains passenger demand data (s11). Specifically, the target timetable creation apparatus 100, for example, obtains passenger demand data predicted by the passenger demand prediction system 300 from the passenger demand prediction system 300, and stores this as the passenger demand data 270.

The target timetable creation apparatus 100 also obtains the current target timetable (s13). Specifically, the target timetable creation apparatus 100, for example, obtains the target timetable from the traffic management system 200 and stores this as the target timetable 310.

The target timetable creation apparatus 100 also obtains running history data (s15). Specifically, the target timetable creation apparatus 100, for example, obtains running history data from the traffic management system 200 and stores this in the data for operation prediction 210.

The target timetable creation apparatus 100 executes a target timetable correction necessity determination process that generates a predicted timetable and further predicts the congestion rate of each train between each pair of adjacent stations to determine whether it is necessary to correct the current target timetable obtained in s13 (s17). Details of the target timetable correction necessity determination process will be described later.

If it is determined by the target timetable correction necessity determination process that it is necessary to correct the current target timetable (s19: YES), the target timetable creation apparatus 100 executes a target timetable correction process (described later) of correcting the current target timetable (s21) and then transmits the target timetable to the traffic management system 200 (s25).

If, on the other hand, it is determined by the target timetable correction necessity determination process that it is not necessary to correct the current target timetable (s19: NO), the target timetable creation apparatus 100 saves the predicted timetable generated in the target timetable correction necessity determination process as a new target timetable (s23) and transmits the target timetable to the traffic management system 200 (s25). This serves as measures to reflect a minor correction for a train delay or the like in the target timetable on the traffic management system side.

In response to receiving the new target timetable transmitted from the target timetable creation apparatus 100, the traffic management system 200 updates the target timetable held therein according to the received target timetable and controls the running of each train according to the updated target timetable. After finishing the process of step s25, the target timetable creation apparatus 100 terminates the timetable update process (s27).

Figure 9:
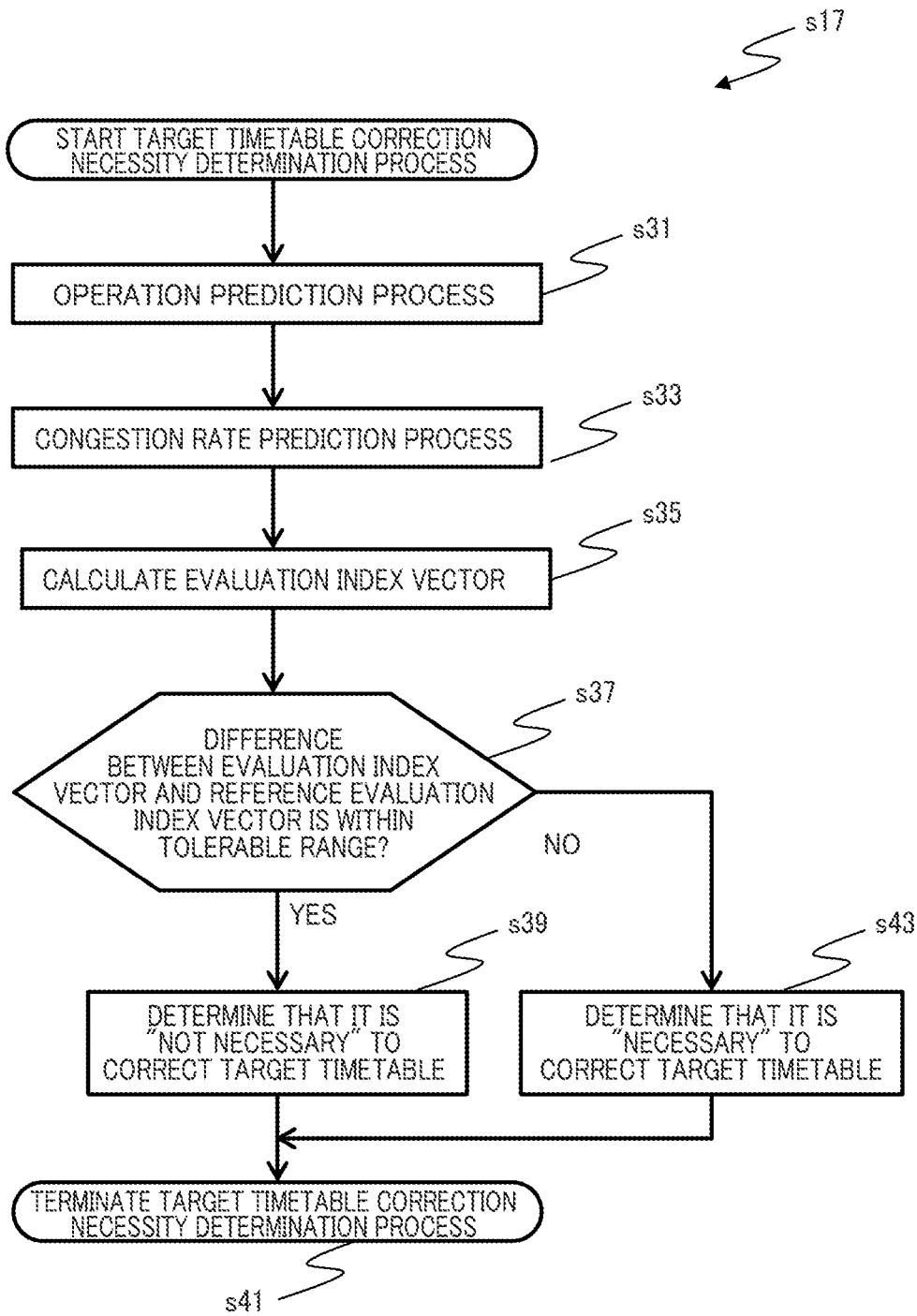
FIG. 9 is a flowchart explaining specific operations in a target timetable correction necessity determination process illustrated in FIG. 8 among the operations of the target timetable creation apparatus illustrated in FIG. 2.

Now, the above-mentioned target timetable correction necessity determination process will be described.
<Target Timetable Correction Necessity Determination Process>
FIG. 9 is a flowchart explaining details of the target timetable correction necessity determination process in the timetable update process. Firstly, the target timetable creation apparatus 100 generates a predicted timetable (s31). Specifically, the target timetable creation apparatus 100, for example, generates a predicted timetable by predicting the operational situation of a group of trains in a predetermined future time range (hereinafter referred to as the prediction time period, e.g., a time period of 24 hours from the current time) based on the target timetable obtained in s13 and the running history information obtained in s15. The target timetable creation apparatus 100 determines the train arrival-departure times also for portions where running histories are found, based on these running histories and includes these in the predicted timetable.

Note that an operation prediction method of predicting the arrival-departure times of each train at each station without a microscopic train running simulation and a method of generating a predicted timetable by this operation prediction method are disclosed in, for example, International Publication No. WO2011/125613.

Further, the target timetable creation apparatus 100 predicts the congestion rate of each train between each pair of adjacent stations in the prediction time period in the case of operating each train according to the predicted timetable generated in s31 (s33). Specifically, the target timetable creation apparatus 100, for example, predicts how passengers moves in the prediction time period (which train each passenger takes from which station to which station) by using the passenger demand data obtained in s11, the predicted timetable generated in s31, and a passenger behavior model stored in the data for congestion rate prediction 250 to thereby predict the number of passengers waiting for trains at each station at each time in the prediction time period and the number of boarded passengers in each train between each pair of adjacent stations.

Note that a method of predicting the congestion rate based on a train timetable is disclosed in, for example, International Publication No. WO2018/087811.

Based on the congestion rate of each train predicted in s33, the target timetable creation apparatus 100 calculates an evaluation index vector for evaluating the service quality of the train timetable in the prediction time period (s35).

The target timetable creation apparatus 100 determines whether the evaluation index vector calculated in s35 is within a tolerable range when compared with a later-described reference evaluation index vector (s37). Specifically, the target timetable creation apparatus 100, for example, compares the index value of each constituent element of the evaluation index vector and that of the reference evaluation index vector with each other and determines whether there is a deviation of a predetermined value or greater. Note that the reference evaluation index vector is an evaluation index vector in a predetermined reference time period. On each day, at the time of starting the train operation, the target timetable creation apparatus 100 generates this reference evaluation index vector based on the train timetable at this time point and the passenger demand data estimated when this train timetable was planned, and stores it in the storage unit 103. Alternatively, the train timetable to be used on each day may be given its identifier, and a reference evaluation index vector calculated in advance may be stored in association with this identifier. Note that data necessary for the generation of the reference evaluation index vector are stored in the storage unit 103 in advance (illustration thereof is omitted).

If the evaluation index vector is within the tolerable range when compared with the reference evaluation index vector (s37: YES), the target timetable creation apparatus 100 determines that it is not necessary to correct the target timetable (s39) and terminates the target timetable correction necessity determination process (s41). If, on the other hand, the evaluation index vector is not within the tolerable range when compared with the reference evaluation index vector (s37: NO), the target timetable creation apparatus 100 determines that it is necessary to correct the target timetable (s43) and terminates the target timetable correction necessity determination process (s41).

Now, the evaluation index vector will be specifically described.

(Evaluation Index Vector)

FIG. 10 is a diagram illustrating an example of the evaluation index vector, and FIG. 11 is a diagram illustrating an example of a railroad line according to this embodiment.

An evaluation index vector 500 is an aggregation of evaluation indexes related to constituent elements forming a train timetable. In the example of FIG. 10, the evaluation index vector 500 includes an average congestion rate element 510 (AVERAGE#CNGSTN#RATE) and a left-behind passenger number element 520 (NUM#PSSNGR#UtB) for each time period. Each average congestion rate element 510 is one evaluation element being the average congestion rate of all trains departing from the station identified by a column 517 in the railroad line identified by a column 515 in the time period from the start time identified by a column 511 to the end time identified by a column 513. This average congestion rate is a weighted average using a later-described (FIG. 12) trapezoidal window function, rather than a simple average, in order to suppress the impact, on the evaluation value, of discrete behavioral differences around time window boundaries resulting from differences in train departure timing. Note that the window function to be used is not limited to a trapezoidal window function as long as it is a window function whose weight increases the closer to the center of the window and is 0 at either end of the window. Each left-behind passenger number element 520 is one evaluation element being the number of passengers left behind at the station identified by a column 527 in the railroad line identified by a column 525 in the time period from the start time identified by a column 521 to the end time identified by a column 523. Defining the evaluation elements such that their time windows, each defined by a start time and an end time, slightly overlap each other allows for reflection of the evaluation at each time equally in the evaluation vector.

Figure 12:
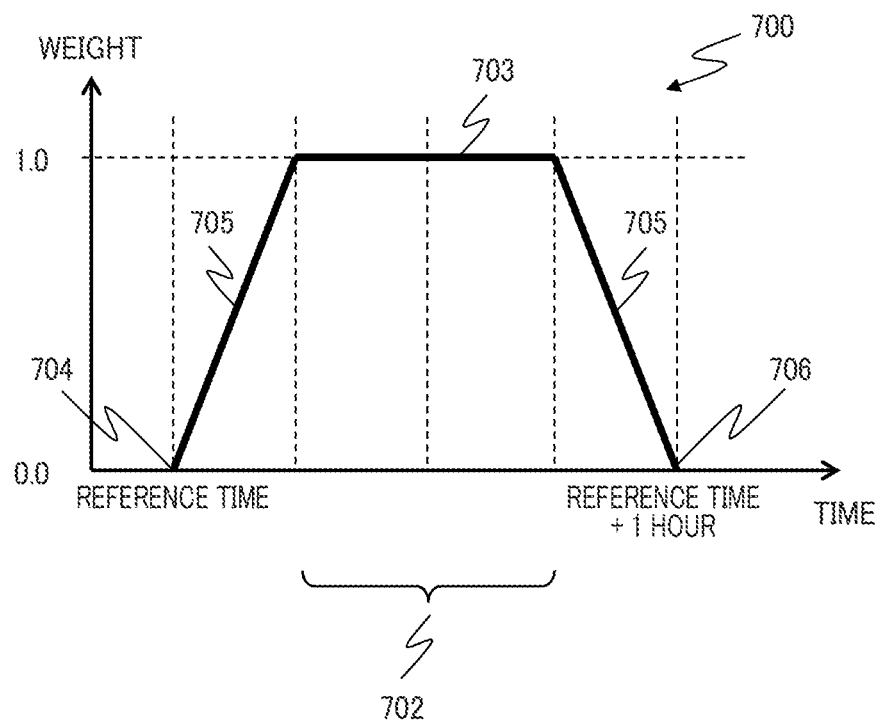
FIG. 12 is a diagram explaining contents of a trapezoidal window function used by the target timetable creation apparatus illustrated in FIG. 2 at the time of calculating an evaluation index vector 500 in the target timetable correction necessity determination process illustrated in FIG. 9.

FIG. 12 is a diagram illustrating an exemplary trapezoidal window function as an example of a window function serving as an adjustment parameter for ensuring continuity between the evaluation index value in each time period and the values in the time periods before and after it at the time of deriving the evaluation index vector 500. The window function is used to obtain a weighted average of evaluation index values. In the case of using a trapezoidal window function 700 in FIG. 12, the evaluation index value in an intermediate time period 702 in each time period takes (e.g., is multiplied by) a constant positive weight value 703. Also, the weight value for the evaluation index value at a start time 704 (reference time) and an end time 706 (one hour after the reference time) in each time period is 0. Moreover, a weight value 705 in the time period between the start time of the intermediate time period 702 and the start time 704 and a weight value 705 in the time period between the end time of the intermediate time period 702 and the end time 706 decrease the closer they get to the start time 704 and the end time 706, respectively.

<Target Timetable Correction Process>

Figure 13:
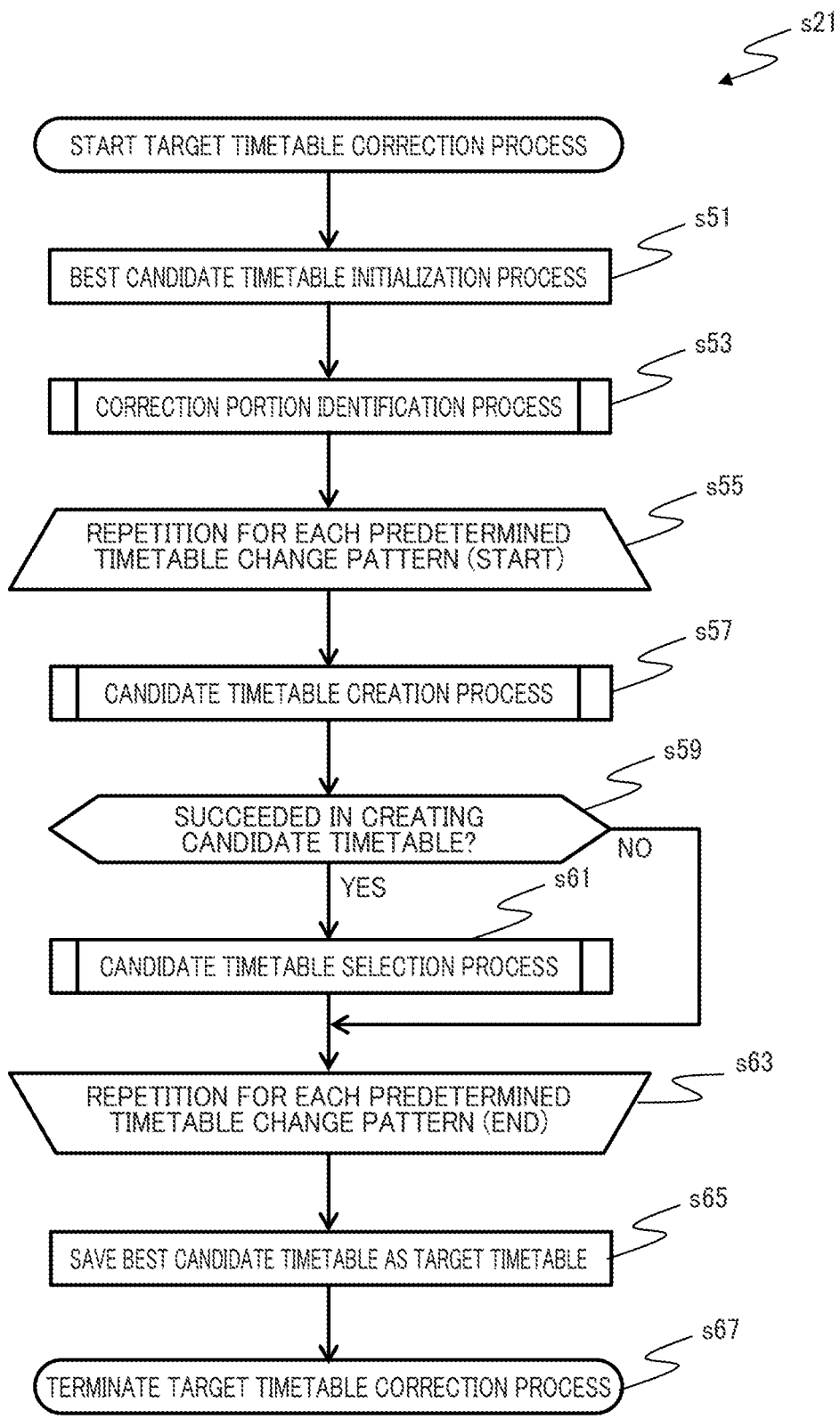
FIG. 13 is a flowchart explaining specific operations in a target timetable correction process illustrated in FIG. 8 among the operations of the target timetable creation apparatus illustrated in FIG. 2.

FIG. 13 is a flowchart explaining an example of the target timetable correction process in the timetable update process. Firstly, the target timetable creation apparatus 100 sets the predicted timetable generated in the timetable correction necessity determination process as the initial values of the most appropriate candidate timetable (best candidate timetable) (s51).

At this time, the target timetable creation apparatus 100 generates an evaluation index vector for this predicted timetable and stores it in association with the best candidate timetable.

The target timetable creation apparatus 100 executes a correction portion identification process of identifying a portion of the predicted timetable that needs to be corrected (one of violating portions, and hereinafter referred to as the correction portion) (s53). Details of the correction portion identification process will be described later.

Also, the target timetable creation apparatus 100 refers to the timetable change pattern database 290 and selects one of the timetable change patterns 291 registered therein (hereinafter referred to as the selected timetable change pattern) (s55).

With the selected timetable change pattern selected in s55, the target timetable creation apparatus 100 executes a candidate timetable creation process of generating a candidate timetable being a train timetable obtained by changing combination elements in the predicted timetable and further optimizing headway elements thereof (s57). Details of the candidate timetable creation process will be described later.

If succeeding in generating a candidate timetable by the candidate timetable creation process (s59: YES), the target timetable creation apparatus 100 executes a candidate timetable selection process of determining whether to set this candidate timetable as a new best candidate timetable (s61). Details of the candidate timetable selection process will be described later.

The target timetable creation apparatus 100 then repeats the processes from s55 so that another timetable change pattern 291 may be selected (s63). A process of s65 to be described later is performed if there is no more timetable change pattern 291 or if an upper limit has been set for the computation time of the portion from step s55 to step s63 and the actual computation time has reached this upper limit.

If, on the other hand, failing to generate a candidate timetable by the candidate timetable creation process (s59: NO), the target timetable creation apparatus 100 repeats the processes from s55 so that another timetable change pattern 291 may be selected (s63).

In s65, the target timetable creation apparatus 100 saves the current best candidate timetable as a new target timetable and terminates the target timetable correction process (s67).

Next, the above-mentioned correction portion identification process in the target timetable correction process will be described.

<Correction Portion Identification Process>

Figure 14:
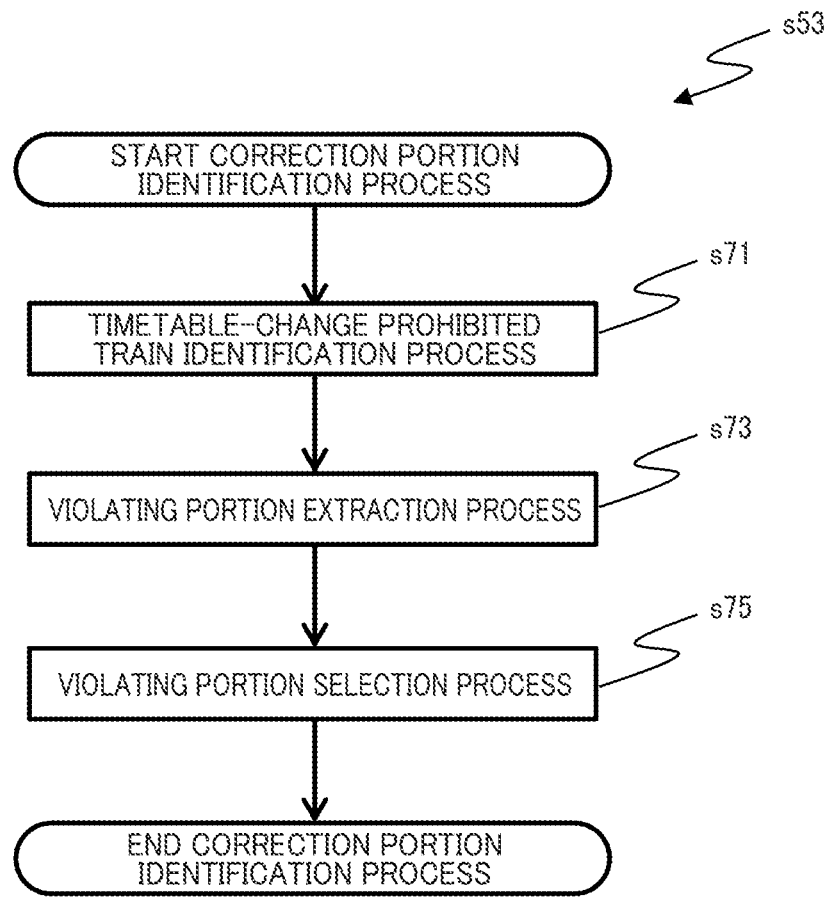
FIG. 14 is a flowchart explaining specific operations in a correction portion identification process illustrated in FIG. 13 among the operations of the target timetable creation apparatus illustrated in FIG. 2.

FIG. 14 is a flowchart explaining details of the correction portion identification process in the target timetable correction process. Firstly, the target timetable creation apparatus 100 identifies and marks timetable-change prohibited trains in step s71 (s71). Specifically, the target timetable creation apparatus 100, for example, excludes, among all trains forming the predicted timetable, the trains which have already departed from their starting stations from the timetable change targets and excludes the trains which have already been listed on each station's platform display from destination change targets.

Next, the target timetable creation apparatus 100 extracts, as a violating portion, each constituent element in the evaluation index vector whose index value deviates from the index value of the same constituent element in the reference evaluation index vector in a positive or negative direction to a degree exceeding a predetermined threshold value (e.g., a station where the number of left-behind passengers exceeds a predetermined threshold value, the section between adjacent stations, among all pairs of adjacent stations, where the congestion rate of a train in the prediction time period exceeds a predetermined threshold value, etc.) (s73).

The target timetable creation apparatus 100 selects one appropriate violating portion among those extracted in s73 (s75). Specifically, the target timetable creation apparatus 100 selects, for example, the one train in the earliest time period among the trains involving the violating portions, or the one train involving the violating portion with the greatest degree of violation. Note that the train in the earliest time period is selected among the trains involving the violating portions since the later the time period of the train, the lower the accuracy of the predicted passenger demand. Note that the trains identified in s71 (the trains marked as timetable-change prohibited trains) are excluded from the selection targets. After finishing the violating portion selection process s75, the target timetable creation apparatus 100 terminates the correction portion identification process.

Next, details of the candidate timetable creation process will be described.

<Candidate Timetable Creation Process>

Figure 15:
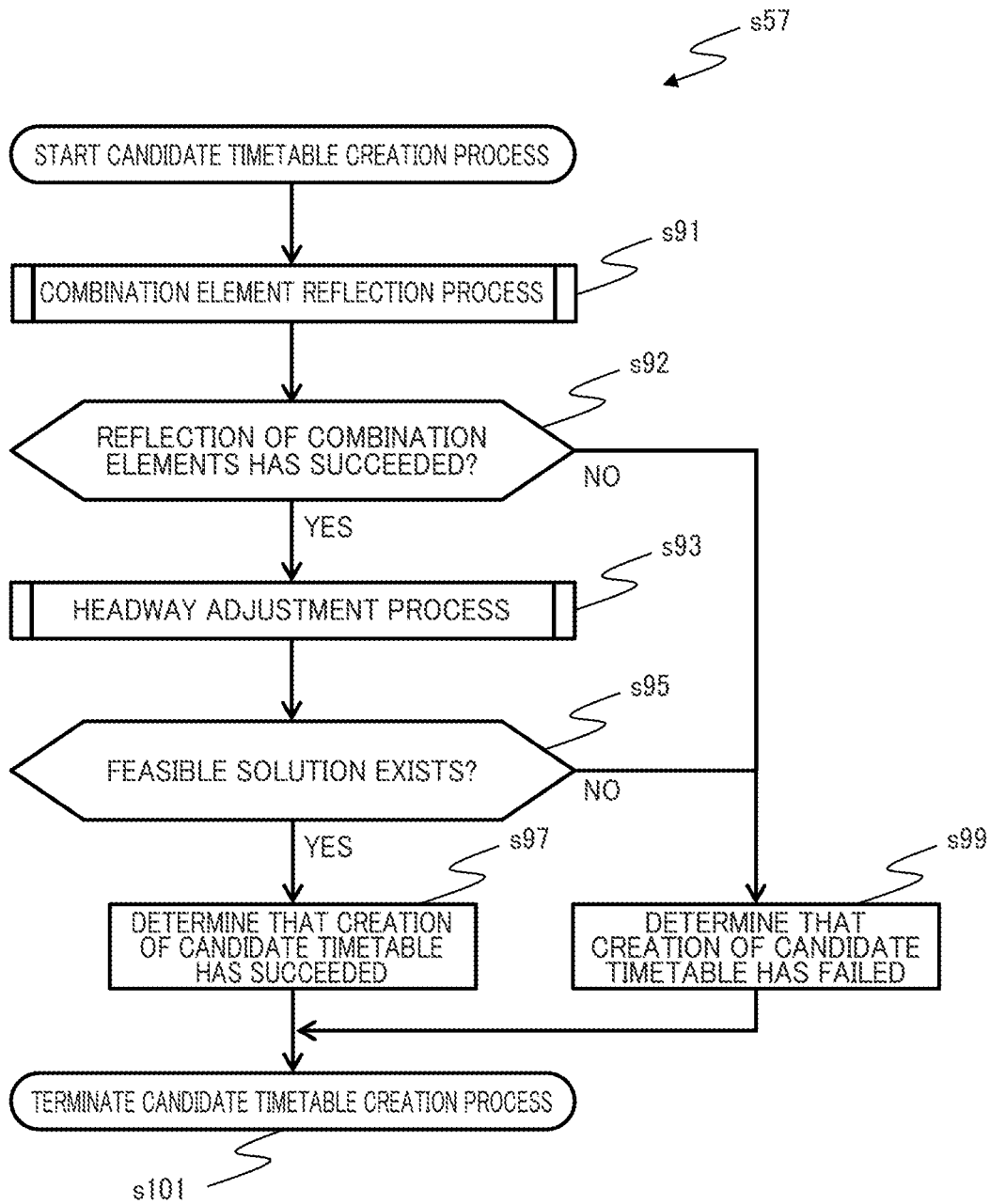
FIG. 15 is a flowchart explaining specific operations in a candidate timetable creation process illustrated in FIG. 13 among the operations of the target timetable creation apparatus illustrated in FIG. 2.

FIG. 15 is a flowchart explaining an example of the candidate timetable creation process in the target timetable correction process. Firstly, the target timetable creation apparatus 100 executes a combination element reflection process on the predicted timetable which changes combination elements identified by the selected timetable change pattern selected in s55 (s91). Specifically, the target timetable creation apparatus 100, for example, generates a new timetable by changing the running order and destinations of trains according to the change contents indicated by the selected timetable change pattern (e.g., determines in what running order, with which vehicles, and to which destinations the trains are to be run according to the given timetable change pattern 291, and fixes the combination elements in the candidate timetable). Details of the combination element reflection process will be described later.

If the reflection of the combination elements has not succeeded in the combination element reflection process (s92: NO), the target timetable creation apparatus 100 determines that "the creation of a candidate timetable has 'failed'" (s99) and terminates the candidate timetable creation process (s101).

If, on the other hand, the reflection of the combination elements has succeeded (s92: YES), the target timetable creation apparatus 100 executes a headway adjustment process being a process of adjusting the headway of each train in the train timetable generated in s91, in which the combination elements have been reflected, in the time periods before and after each portion where a change occurred due to the reflection of the combination elements (s93). Specifically, the target timetable creation apparatus 100, for example, changes the arrival-departure times of each train at each station on condition that the combination elements are not changed. Details of the headway adjustment process will be described later.

Subsequently, the target timetable creation apparatus 100 determines whether a feasible solution has been found in the headway adjustment process in s93 (s95).

If a feasible solution has been found (s95: YES), the target timetable creation apparatus 100 determines that the generation of a candidate timetable has succeeded (s97) and terminates the candidate timetable creation process (s101). If, on the other hand, a feasible solution has not been found (s95: NO), the target timetable creation apparatus 100 determines that the generation of a candidate timetable has failed (s99) and terminates the candidate timetable creation process (s101).

Now, details of the combination element reflection process in the candidate timetable creation process will be described.

(Combination Element Reflection Process)

Figure 16:
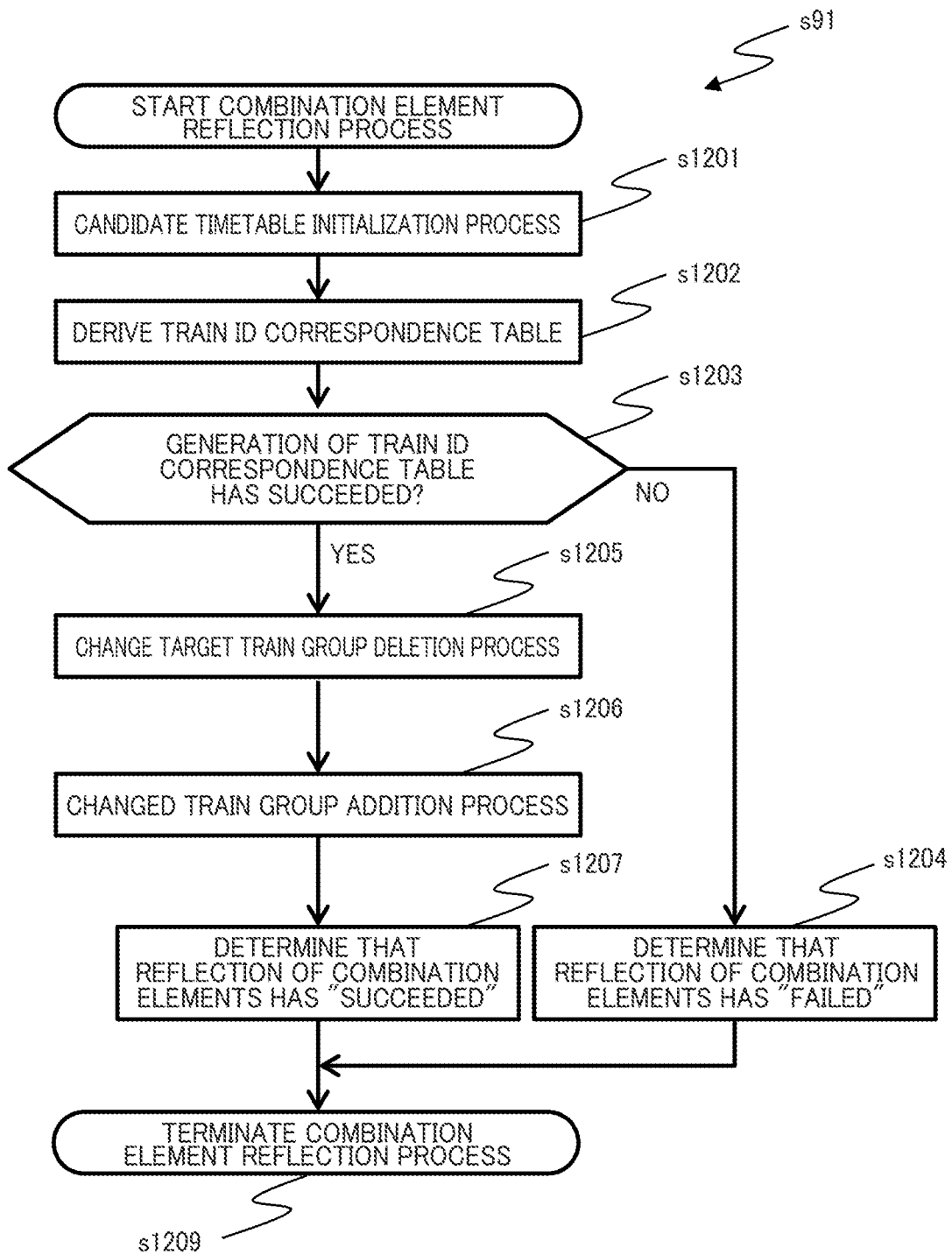
FIG. 16 is a flowchart explaining specific operations in a combination element reflection process illustrated in FIG. 15 among the operations of the target timetable creation apparatus illustrated in FIG. 2.

FIG. 16 is a flowchart explaining an example of the combination element reflection process in the candidate timetable creation process. The target timetable creation apparatus 100 performs a candidate timetable initialization process (s1201). Specifically, the target timetable creation apparatus 100, for example, copies the predicted timetable derived in the target timetable correction necessity determination process s17 and registers it as the initial values of a candidate timetable.

Then, the target timetable creation apparatus 100 generates a train ID correspondence table in which the train IDs in the timetable change pattern 291 and the train IDs in the candidate timetable are associated with each other (s1202). Specifically, the target timetable creation apparatus 100, for example, creates the directed graph 931 from the timetable change pattern 291, associates the train ID indicated by the reference train ID 902 in the timetable change pattern 291 and the train ID in the correction portion identified in the correction portion identification process, and traces the arcs 935 in the generated directed graph 931 to thereby figure out the correspondence of the train IDs in the timetable change pattern 291 with the trains in the candidate timetable.

The target timetable creation apparatus 100 determines whether the generation of a train ID correspondence table in s1202 has succeeded (s1203).

Specifically, for example, if the trains whose train attributes 9015 in the pattern matching information 901 in the timetable change pattern 291 are "change target" are associated with the timetable-change prohibited trains identified in the correction portion identification process, or association matching the pattern matching information 901 cannot be obtained (e.g., if the train IDs in the timetable change pattern 291 and the train IDs in the candidate timetable are not in a one-to-one correspondence or if the trains with the train IDs in the timetable change pattern 291 and the trains with the train IDs in the candidate timetable have different route IDs), the current timetable change pattern 291 is not applicable to the correction portion. In this case, the target timetable creation apparatus 100 determines that the generation of a train ID correspondence table has failed.

If, on the other hand, association matching the pattern matching information 901 can be obtained such that the trains whose train attributes 9015 in the pattern matching information 901 in the timetable change pattern 291 are "change target" are not associated with the timetable-change prohibited trains identified in the correction portion identification process, the target timetable creation apparatus 100 determines that the generation of a train ID correspondence table has succeeded.

If determining that the generation of a train ID correspondence table has failed (s1203: NO), the target timetable creation apparatus 100 determines that the reflection of the combination elements has failed (s1204) and terminates the combination element reflection process (s1209).

If, on the other hand, determining that the generation of a train ID correspondence table has succeeded (s1203: YES), the target timetable creation apparatus 100 performs a change target train group deletion process (s1205). Specifically, the target timetable creation apparatus 100, for example, refers to the train ID correspondence table and deletes the train IDs listed in the change target train group information 903 in the timetable change pattern 291 from the current candidate timetable. At this time, for the change target train group information 903, the target timetable creation apparatus 100 updates information on the subsequent operation train associated with the previous operation train of the train with each train ID to be deleted with information indicating "subsequent operation not determined", and also updates information on the previous operation train associated with the subsequent operation train of the train with the train ID to be deleted with information indicating "previous operation not determined".

Then, the target timetable creation apparatus 100 performs a changed train group addition process of adding the trains corresponding to the train IDs listed in the changed train group information 904 to the candidate timetable by referring to the train ID correspondence table (s1206).

Specifically, the target timetable creation apparatus 100, for example, adds the train ID of each train immediately after its arrival-departure platform preceding trains and immediately after its between-adjacent-stations preceding trains in the order of stations determined by the route ID from the starting station.

Note that a specific train ID allocation method may be, for example, such that the target timetable creation apparatus 100 allocates train IDs not present in the current candidate timetable as the train IDs in the candidate timetable corresponding to the train IDs to be newly added in accordance with a predetermined rule.

Also, other information is updated as follows, for example. Specifically, for the previous operation train of each added train, the target timetable creation apparatus 100 updates information on the subsequent operation train associated with this previous operation train such that the information indicates the added train. Similarly, for the subsequent operation train of each added train, the target timetable creation apparatus 100 updates information on the previous operation train associated with this subsequent operation train such that the information indicates the added train. Moreover, as for the arrival time and departure time of each added train at each station, the target timetable creation apparatus 100 registers temporary times that satisfy the relationship between the preceding train and the subsequent train and the relationship between the previous operation train and the subsequent operation train. These values will be adjusted in the later-described headway adjustment process s93.

The target timetable creation apparatus 100 then determines that the reflection of the combination elements has "succeeded" (s1207) and terminates the combination element reflection process (s1209).

(Specific Example of Combination Element Reflection Process)

Figure 17:
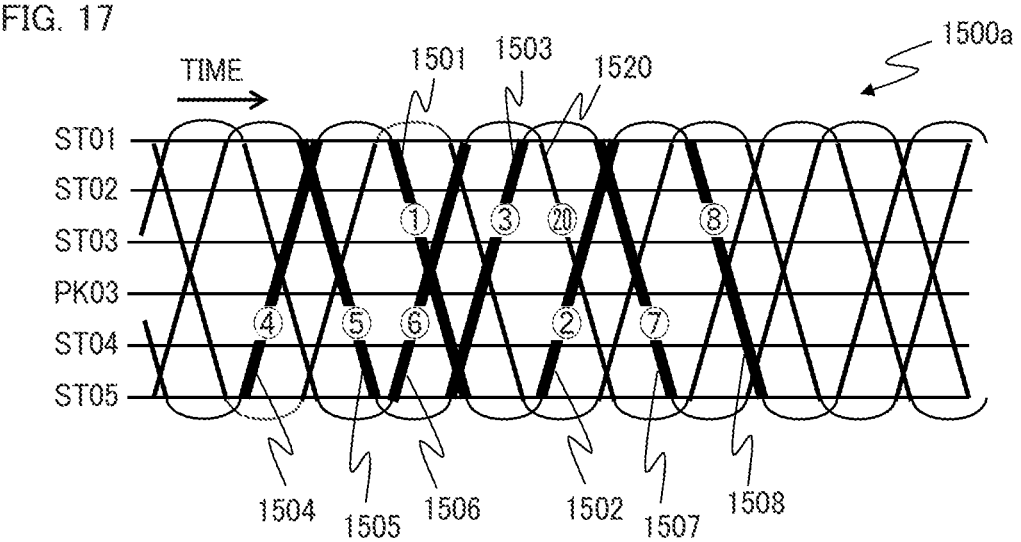
FIG. 17 is a diagram explaining operations in the combination element reflection process illustrated in FIG. 16 and is a timetable diagram illustrating the state of a train timetable before execution of the combination element reflection process.
Figure 18:
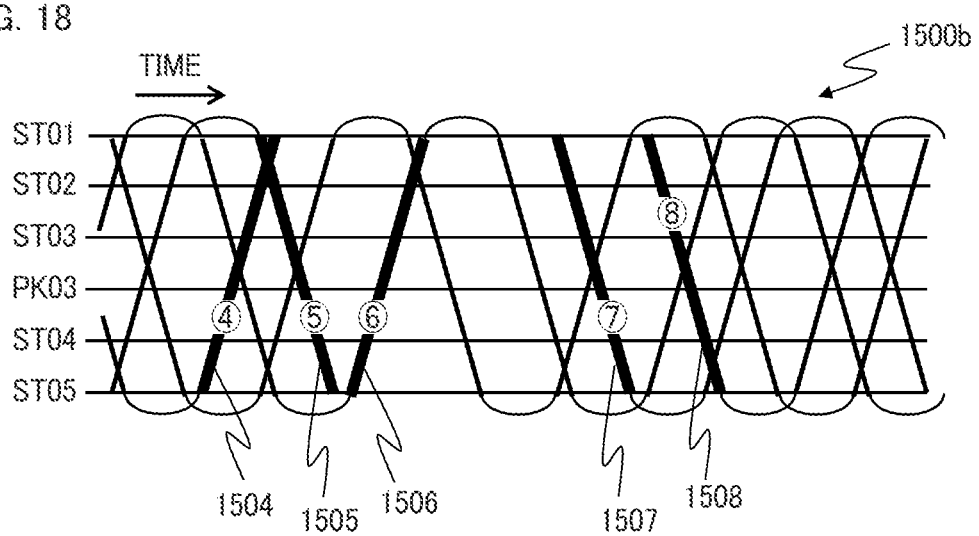
FIG. 18 is a diagram explaining the operations in the combination element reflection process illustrated in FIG. 16 and is a timetable diagram illustrating the state of a train timetable after execution of a change target train group deletion process on a train timetable 1500a in the state of FIG. 17.
Figure 19:
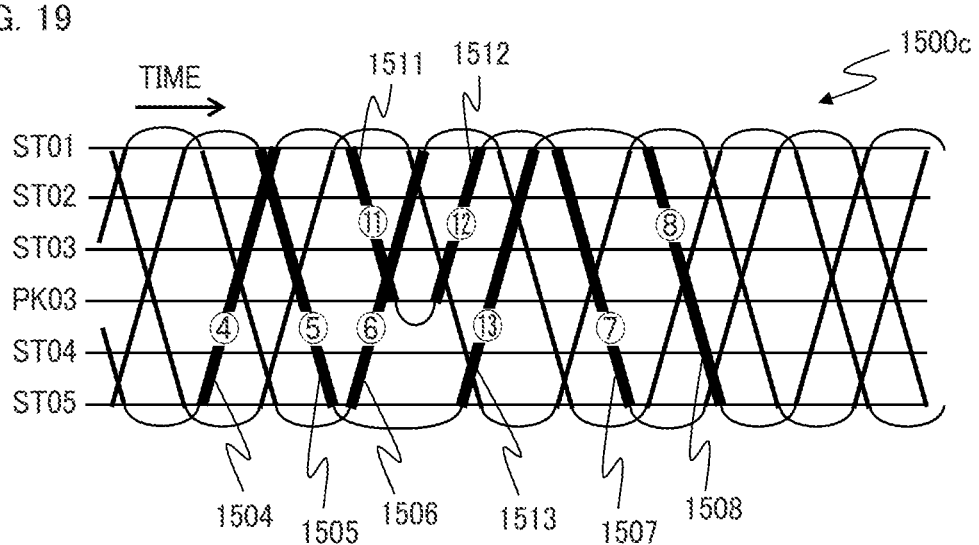
FIG. 19 is a diagram explaining the operations in the combination element reflection process illustrated in FIG. 16 and is a timetable diagram illustrating the state of a train timetable after execution of a changed train group addition process on a train timetable 1500b in the state of FIG. 18.

A specific example of the combination element reflection process will be described below using FIGS. 17 to 19. FIG. 17 is a timetable diagram illustrating the state of a train timetable 1500a before execution of the combination element reflection process. FIG. 18 is a timetable diagram illustrating the state of a train timetable 1500b being the train timetable 1500a after execution of the change target train group deletion process thereon. FIG. 19 is a timetable diagram illustrating the state of a train timetable 1500c being the train timetable 1500b after execution of the changed train group addition process thereon. In these diagrams, a train line 1501 corresponds to a train TR001, a train line 1502 corresponds to a train TR002, a train line 1503 corresponds to a train TR003, a train line 1504 corresponds to a train TR004, a train line 1505 corresponds to a train TR005, a train line 1506 corresponds to a train TR006, a train line 1507 corresponds to a train TR007, a train line 1508 corresponds to a train TR008, a train line 1511 corresponds to a train TR101, a train line 1512 corresponds to a train TR102, a train line 1513 corresponds to a train TR103, and a train line 1520 corresponds to a train TR020.

In the following, a description will be given of an exemplary case of associating "PTR001" being the reference train in the timetable change pattern 291 exemplarily illustrated in FIGS. 3 to 7 with the train "TR001" in the train timetable 1500a in FIG. 17. Here, it is to be noted that each train timetable 1500 is a type of train timetable called a pattern timetable, and since the train "TR001" and the train "TR020" are equivalent to each other, the timetable change pattern 291 exemplarily illustrated above can associate "PTR001" being the reference train in the timetable change pattern 291 not only with the train "TR001" in the train timetable 1500 but also with the train "TR020" therein. That is, the number of timetable change patterns 291 to be registered in the timetable change pattern database 290 in advance can be reduced by creating the timetable change patterns 291 with use of characteristic features of a pattern timetable.

In the case of associating "PTR001" being the reference train in the timetable change pattern 291 exemplarily illustrated in FIGS. 3 to 7 with the train "TR001" in FIG. 17, the train IDs in the timetable change pattern 291 and the actual trains are associated with one another such that "PTR001" in the timetable change pattern 291 is uniquely associated with the train "TR001", "PTR002" in the timetable change pattern 291 is uniquely associated with the train "TR002", "PTR003" in the timetable change pattern 291 is uniquely associated with the train "TR003", "PTR004" in the timetable change pattern 291 is uniquely associated with the train "TR004", "PTR005" in the timetable change pattern 291 is uniquely associated with the train "TR005", "PTR006" in the timetable change pattern 291 is uniquely associated with the train "TR006", "PTR007" in the timetable change pattern 291 is uniquely associated with the train "TR007", and "PTR008" in the timetable change pattern 291 is uniquely associated with the train "TR008".

When the change target train group deletion process is then executed, the state of the train timetable 1500b illustrated in FIG. 18 is obtained. Specifically, "TR001", the train "TR002", and the train "TR003" being the trains corresponding respectively to "PTR001", "PTR002", and "PTR003", which are the change targets, are deleted from the state of the train timetable 1500a.

When the changed train group addition process is then executed, the state of the train timetable 1500c illustrated in FIG. 19 is obtained. Specifically, trains "TR101", "TR102", and "TR103" corresponding respectively to "PTR101", "PTR102", and "PTR103" registered in the changed train group information 904 exemplarily illustrated in FIG. 7 are each added in the operation route indicated by the corresponding route ID in the changed train group information 904 in such a running order with respect to the arrival-departure platforms that the train is immediately after the preceding trains indicated by the arrival-departure platform preceding trains 9045 in the changed train group information 904 and in such a running order with respect to the tracks between adjacent stations that the train is immediately after the preceding trains indicated by the between-adjacent-stations preceding trains 9046 in the changed train group information 904. Moreover, the previous operation train and the subsequent operation train are registered according to the information indicated by the previous operation train ID 9043 and the subsequent operation train ID 9044 in the changed train group information 904. Further, of the pieces of operation information on "TR004" and "TR005", which are previous operation trains, the pieces of information on their subsequent operation trains are updated to "TR101" and "TR103", respectively, to thereby be consistent. Of the pieces of operation information on "TR007" and "TR008", which are subsequent operation trains, the pieces of information on their previous operation trains are updated to "TR102" and "TR103", respectively, to thereby be consistent.

Note that, for example, for a portion expected to be infrequently used by trains, such as a sidetrack "PK03", the determining of whether the reflection of combination elements for this portion has succeeded or failed (s92) may be done after an optimal solution is derived in the later-described headway adjustment process s93. Specifically, the target timetable creation apparatus 100, for example: sets "Don't Care" for "the preceding train on the track to be used at the time of moving from ST03 to PK03", "the preceding train at the time of arriving at PK03", and "the preceding train on the track to be used at the time of moving from PK03 to ST03"; when creating constraint conditions in the headway adjustment process, does not create constraint conditions based on the inter-train relationship (i.e., constraint conditions for ensuring a headway between the preceding train and the subsequent train) for the above portion but creates only constraint conditions on the inter-station running time and the dwell time at "PK03" and derives an optimal solution under these; and determines that "no feasible solution exists" if another train is using the sidetrack "PK03" in the period from the arrival time to the departure time at the sidetrack "PK03" in the obtained optimal solution. With such a configuration, the number of cases where it is determined that "no feasible solution exists" may increase, but the combination elements in a plurality of patterns differing only in the information for identifying the preceding train at a portion expected to be infrequently used can be expressed with the same timetable change pattern. Accordingly, the number of timetable change patterns to be registered in the timetable change pattern database 290 can be reduced. Note that the above "Don't Care" has a different meaning from the "Don't Care" mentioned earlier (described with FIG. 4, for example), which represents "no preceding train". For this reason, to distinguish them, an exception value different from the "Don't Care" is registered in the values of the arrival-departure platform preceding trains or the between-adjacent-stations preceding trains registered in the changed train group information 904 so that an appropriate process can be selected.

This concludes the description of the combination element reflection process.

Next, details of the headway adjustment process s93 in the candidate timetable creation process s57 will be described.

<Headway Adjustment Process>

Figure 20:
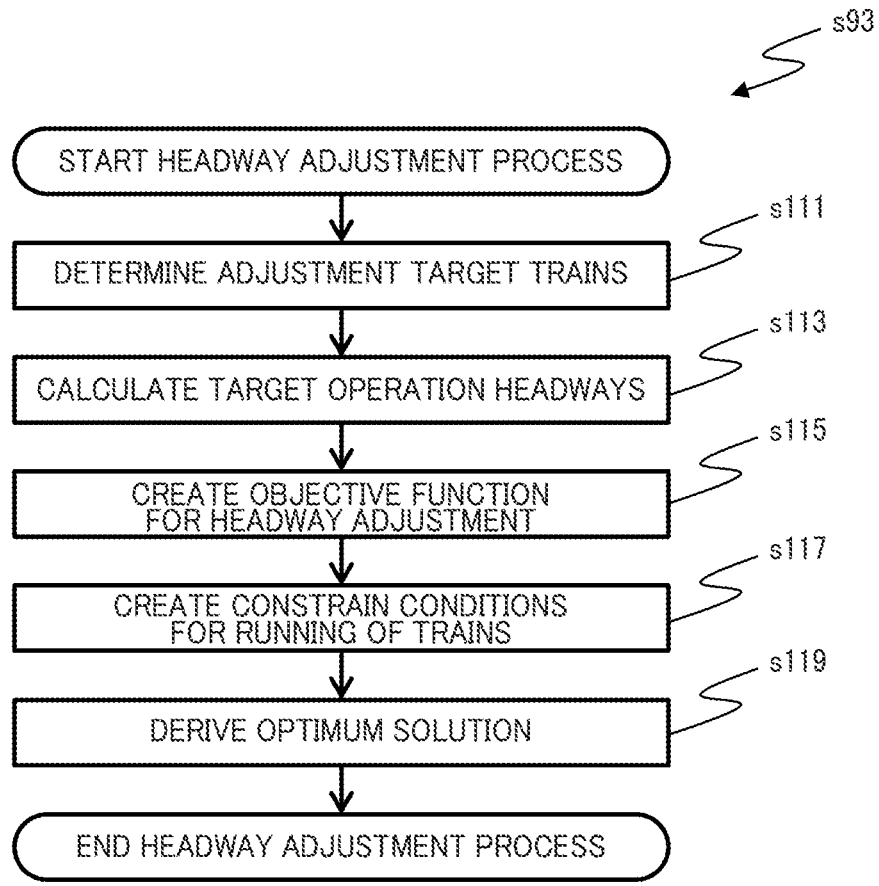
FIG. 20 is a flowchart explaining specific operations in a headway adjustment process illustrated in FIG. 15 among the operations of the target timetable creation apparatus illustrated in FIG. 2.

FIG. 20 is a flowchart explaining an example of the headway adjustment process in the candidate timetable creation process. In the headway adjustment process, the target timetable creation apparatus 100 determines an arrival time ARV(TRi, STj) (after the headway adjustment) of each train TRi at each station STj and a departure time DPT(TRi, STj) (after the headway adjustment) of each train TRi at each station STj without changing portions related to combination elements (such as the number of trains, the operation routes, the running order, and the tracks and platforms to be used).

Upon start of the headway adjustment process, firstly in step s111, the target timetable creation apparatus 100 determines the trains to be subjected to the headway adjustment among the trains in the train timetable whose combination elements have been changed in step s91. Specifically, the target timetable creation apparatus 100, for example, refers to the headway adjustment target range information 905 and determines a group of trains including the trains subjected to the combination element change and the trains of the train lines before and after them as the trains to be subjected to the headway adjustment.

Then, in step s113, for each of the trains determined to be subjected to the headway adjustment in step s111, the target timetable creation apparatus 100 calculates a target operation headway being an ideal operation headway based on the change in predicted passenger demand over time.

Now, a method of calculating this operation headway will be described using FIG. 21.

(Method of Calculating Target Operation Headway)

Figure 21:
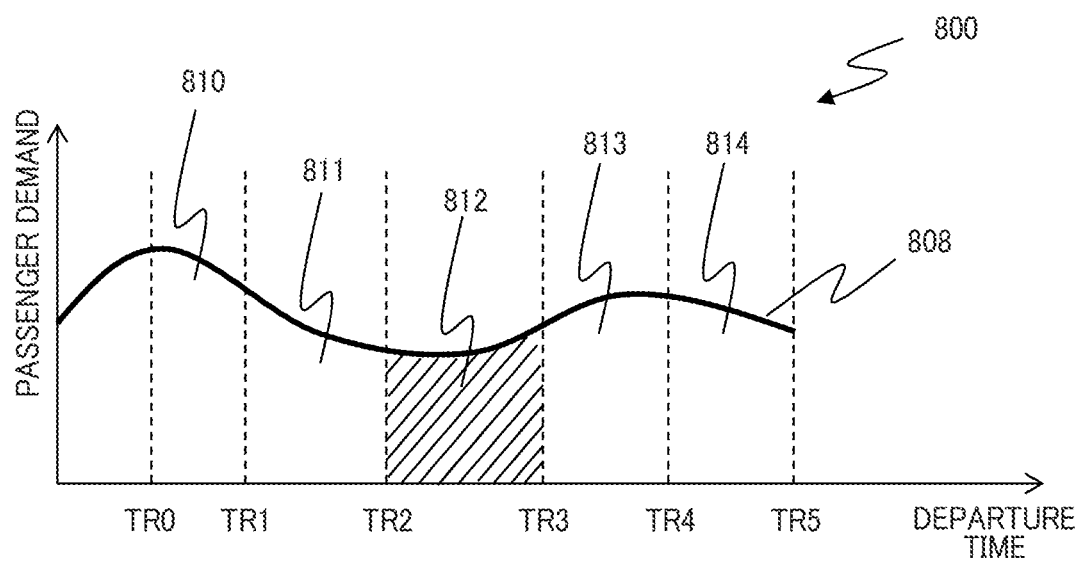
FIG. 21 is a diagram explaining a method of calculating target operation headways in the headway adjustment process illustrated in FIG. 15.

FIG. 21 is a diagram explaining an example of the method of deriving an ideal value of the operation headway of each train in the headway adjustment process. In FIG. 21, the horizontal axis represents the departure time of each train at a predetermined station of interest while the vertical axis represents the passenger demand (since this embodiment assumes the simple railroad line example illustrated in FIG. 11, the passenger demand is, for example, a value indicating the number of passengers who have arrived at the station of interest at each time and are wishing to get on a next arriving train). FIG. 21 represents an exemplary case of adjusting the departure times of trains TR1, TR2, TR3, and TR4 without shifting the departure times, at the station of interest, of a train TR0 serving as a reference on an early departure time side and the trains departing from the station before the train TR0 and the departure times, at the station of interest, of a train TR5 serving as an later departure time side and the trains departing from the station after the train TR5 when the passenger demand varies over time as indicated by a predicted passenger demand curve 808. In this adjustment, the chronological order of departure from the station of interest is maintained as TR0, TR1, TR2, TR3, TR4, and TR5. At this time, the target timetable creation apparatus 100 derives ideal values of the departure times of TR1 to TR4 (i.e., the ideal values of the operation headways of the trains) as follows. Firstly, the passenger demands in the time period from the departure time of the train TR0 to the departure time of the train TR5 are integrated to derive the total passenger demand, i.e., the total number of passengers wishing to get on trains in this time period. Then, on the assumption that the passengers in the time period are to be transported by five trains TR1, TR2, TR3, TR4, and TR5, the number of passengers to be located per train is derived such that each train is allocated the same number of passengers. Lastly, the departure times of four trains TR1, TR2, TR3, and TR4 are determined in this order such that definite integral values 810, 811, 812, 813, and 814 corresponding to the numbers of passengers to be on the respective trains are each equal to the number of passengers to be allocated mentioned above. As a result, the ideal values of the operation headways are calculated such that the number of passengers on each train, i.e., the congestion rate, is equalized.

Note that when the transport capacity varies from train to train, such as when the number of cars per train set varies, the ideal values of the operation headways may be derived such that, instead of "the number of passengers to be allocated to each train", "the ratio of the number of passengers to be allocated to each train to its transport capacity" is equalized. It is easy to make such a change.

The description now returns to FIG. 20. In step s115, the target timetable creation apparatus 100 creates an objective function for the headway adjustment based on the target operation headways calculated in step s113. The objective function to be derived by the target timetable creation apparatus 100 is such a function that an evaluation value (output value) on the operation headway of each train gets worse the farther the operation headway deviates from the corresponding target operation headway described above, and is a function as below, for example. In step s119 to be described later, an optimal solution is derived on the assumption that a solution that minimizes an objective function f1 below is the best solution.

Objective function $f1 = \Sigma$ |HDW(TRi, STj)—Ideal HDW(TRi, STj)|

Here, while Z represents a summation for pairs of an adjustment target train TRi and a train of interest STj, they are summation targets only if the adjustment target train TRi runs to and from the station of interest STj. Note that there is usually one or more values for the suffix i in the adjustment target train TRi (i.e., one or more train are adjustment targets), and also there is usually one or more values for the suffix j in the station of interest STj (e.g., focusing on a plurality of stations, such as ST14 and ST16, is allowed). Also, HDW(TRi, STj) is the operation headway based on the train TRi at the station STj (the operation headway between the train TRi and its subsequent train), and Ideal HDW(TRi, STj) is the target operation headway based on the train TRi at the station STj (the ideal operation headway between the train TRi and its subsequent train). The operation headway HDW(TRi, STj) based on the train TRi at the station STj is represented by the equation below, for example.

HDW(TRi, STj)=DPT(NEXT(TRi, STj), STj)−DPT(TRi, STj)

Here, NEXT(TRi, STj) represents the next train at the station STj following the train TRi.

Next, in step s117, the target timetable creation apparatus 100 creates constraint conditions for the running of the trains. As the constraint conditions for the running of the trains, there are two types, constraint conditions for operation prediction and a constraint condition for the train operation service, and constraint conditions as below are created, for example. As mentioned earlier, the decision variables are the arrival time ARV(TRi, STj) of each train TRi at each station STj and the departure time DPT(TRi, STj) of each train TRi at each station STj, and these variables are used to create the following constraint conditions.

The constraint conditions for operation prediction are as follows. Note that conditions 4 and 5 are conditions similar to those employed in publicly known operation prediction techniques utilizing PERT or the like, and the necessity of these constraint conditions for each station is determined depending on the track layout.

(Condition 1) The running time of each train between each pair of adjacent stations after the headway adjustment is equal to the original running time before the headway adjustment.

(Condition 2) The dwell time of each train at each station after the headway adjustment is equal to the dwell time before the headway adjustment.

(Condition 3) The turnaround time of each train at each turnaround station after the headway adjustment is a preset minimum turnaround time or longer.

(Condition 4) The arrival time of the subsequent train of each train at each station after the headway adjustment is "departure time of preceding train+minimum headway" or later.

(Condition 5) The arrival or departure time of the subsequent train of each train at each station after the headway adjustment is "departure or arrival time of preceding train+ junction margin" or later.

The constraint condition for the train operation service is as follows.

(Condition 6) The departure intervals of trains at each station after the headway adjustment is a preset maximum wait time or shorter.

By creating the constraint conditions for the running of trains in this manner, it is possible to create a train timetable in which each passenger's travel time from getting on a train to arriving at a destination remains unchanged and the operation headway is adjusted by means of a turnaround time, when deriving an optimal solution in the later-described step s119.

In step s119, the target timetable creation apparatus 100 derives a value of each decision variable that satisfies the constraint conditions generated in s117 and also minimizes the value of the objective function generated in s115 (i.e., optimal solution), and terminates the headway adjustment process.

The calculation of the optimal solution in step s119 may be performed using a publicly known technique, such as a mixed integer programming solver, for example. Also, in view of the response performance required, if there is no sufficient computation time available for deriving the optimal solution, a quasi-optimal solution that can be executed within a limited time range may be derived and output. If no feasible solution is found, the target timetable creation apparatus 100 outputs information indicating that no feasible solution is found so that "NO" can be selected at the condition branch of step s95 in the candidate timetable creation process in FIG. 15.

If a feasible solution is found in step s119, the target timetable creation apparatus 100, before terminating the headway adjustment process, reflects the derived value of each decision variable, i.e., the arrival time ARV(TRi, STj) of each train TRi at each station STj after the headway adjustment and the departure time DPT(TRi, STj) of each train TRi at each station STj after the headway adjustment, in the candidate timetable to be created.

<Candidate Timetable Selection Process>

Next, the candidate timetable selection process in the target timetable correction process will be described.

Figure 22:
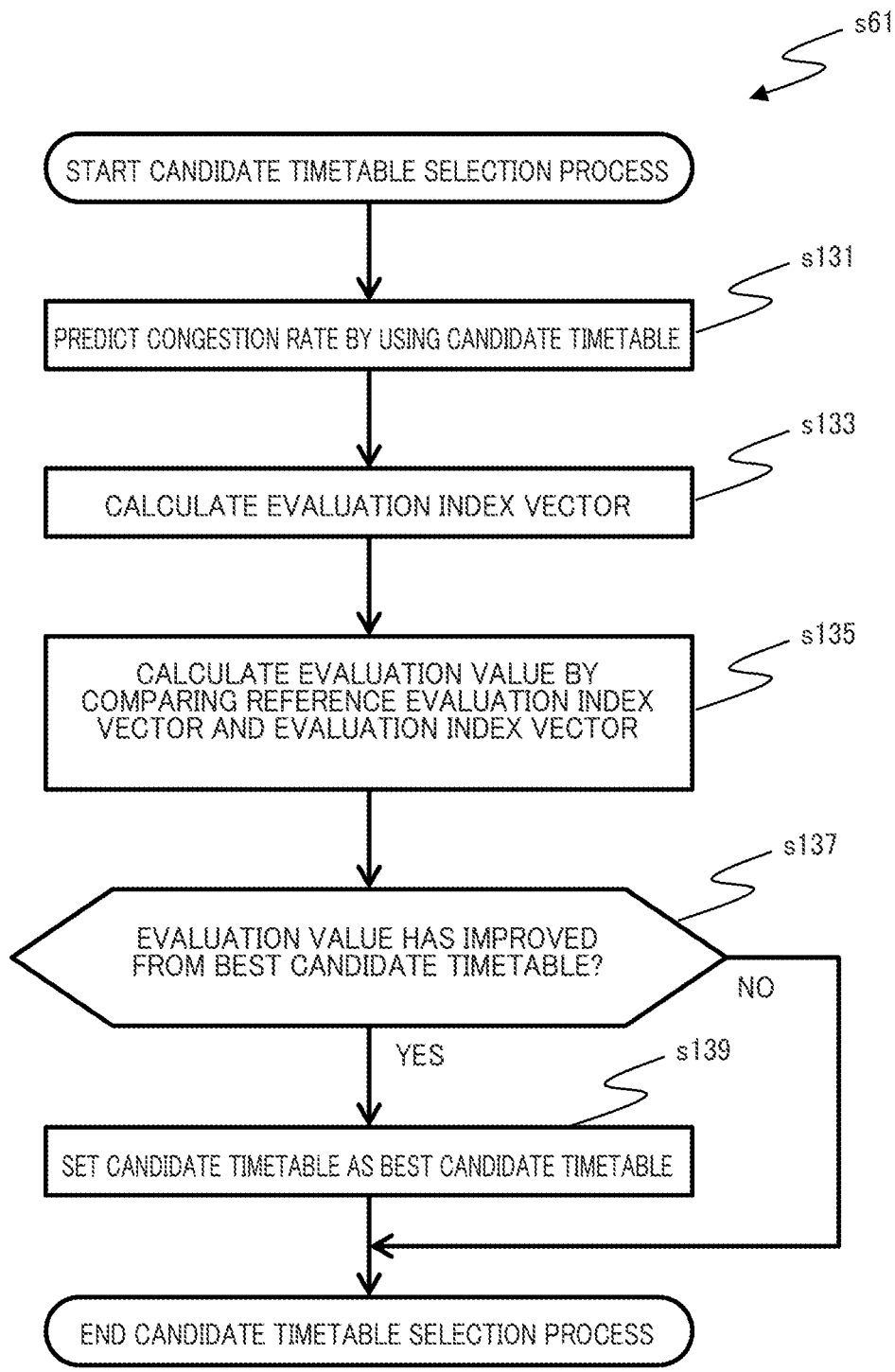
FIG. 22 is a flowchart explaining specific operations in a candidate timetable selection process illustrated in FIG. 13 among the operations of the target timetable creation apparatus illustrated in FIG. 2.

FIG. 22 is a flowchart explaining an example of the candidate timetable selection process s61 in the target timetable correction process s21.

Upon start of the candidate timetable selection process, firstly in step s131, the target timetable creation apparatus 100 predicts the congestion rate of each train between each pair of adjacent stations in the prediction time period in the candidate timetable successfully created in the candidate timetable creation process s57.

Subsequently, in step s133, the target timetable creation apparatus 100 calculates an evaluation index vector corresponding to the candidate timetable based on the congestion rate predicted in step s131.

Then, in step s135, the target timetable creation apparatus 100 calculates an evaluation value by comparing the evaluation index vector calculated in step s133 and the reference evaluation index vector generated in advance. As this evaluation value, for example, an evaluation value is used which can measure similarity between the two, such as "the size of a vector representing the difference between the two" and indicates a "better" evaluation the more similar the two are. Here, the train timetable at the point of deriving the reference evaluation index vector and the candidate timetable do not necessarily match each other even without the aspect of time, and therefore a comparison on a train-to-train basis is meaningless. For this reason, an evaluation index vector is prepared so that a comparison of statistical amounts can be made, as exemplarily illustrated in FIG. 10, for example.

If the evaluation value calculated in step s135 is better than an evaluation value calculated from the evaluation index vector corresponding to the best candidate timetable and the reference evaluation index vector, that is, if the present candidate timetable is closer to the service quality estimated in the planning stage than the current best candidate timetable is ("YES" in step s137), the target timetable creation apparatus 100 sets the present candidate timetable as a new best candidate timetable in step s139, and terminates the candidate timetable selection process. If, on the other hand, the evaluation value calculated in step s135 is not better than the evaluation value calculated from the evaluation index vector corresponding to the best candidate timetable and the reference evaluation index vector ("NO" in step s137), the target timetable creation apparatus 100 terminates the candidate timetable selection process without updating the best candidate timetable. Note that in the case of setting the present candidate timetable as a new best candidate timetable in step s139, the target timetable creation apparatus 100 also stores the evaluation value corresponding to the resent candidate timetable with it.

As described above, according to this embodiment, the configuration is such that a candidate timetable as an update candidate for the target timetable is created by calculating ideal operation headways based on a predicted passenger demand, generating an objective function for operation headways based on the ideal operation headways, and optimizing the turnaround time of each train based on the objective function under constraint conditions to be satisfied for the running of the trains. In this way, even if the ideal operation headways cannot be implemented due to some reason, it is still possible to create a candidate timetable whose degree of match with the passenger demand is more equalized than conventional techniques, and thus provide a train operation service to passengers with a more uniform quality.

Further, the configuration is such that, with an evaluation index vector, a candidate timetable closer to the service quality estimated in the original plan is better. In this way, even in the case of making an evaluation by looking only at the congestion rate, for example, "a train operation service with a quality close to a reference service quality" can be provided without turning into an excessive service as a result of frequently adding an extra train.

Thus, with the automatic train control system 1 in this embodiment, it is possible to provide a train operation service to passengers with a more uniform quality than conventional techniques even when the passenger demand varies, in other words, it is possible to provide a train operation service to passengers with a quality closer to a reference service quality (e.g., a service quality estimated in the planning stage).

Second Embodiment

A second embodiment of the present invention will be described below by using FIGS. 23 and 24. This embodiment is an example preferably applicable to a loop line. A target timetable creation apparatus 100a (not illustrated) in this embodiment differs from the target timetable creation apparatus 100 in the above-described first embodiment in the contents of the headway adjustment process s93. Thus, the contents of the headway adjustment process in this embodiment will be described in detail below.

Figure 23:
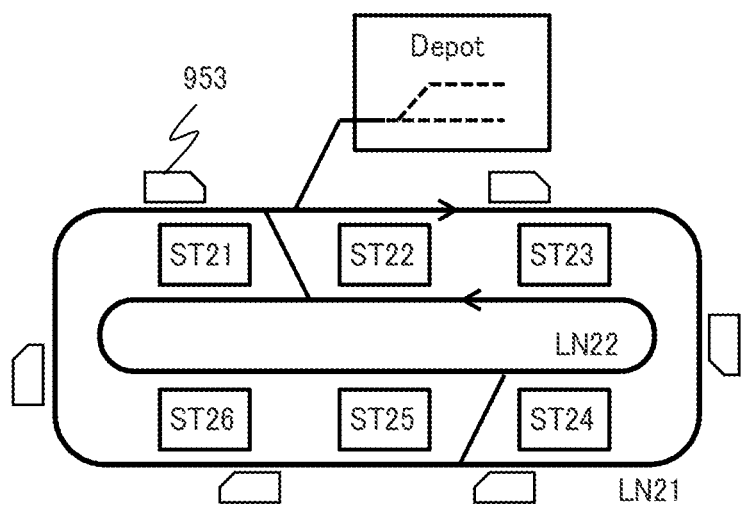
FIG. 23 is a diagram illustrating an example of a railroad line to which a second embodiment is preferably applicable.
Figure 24:
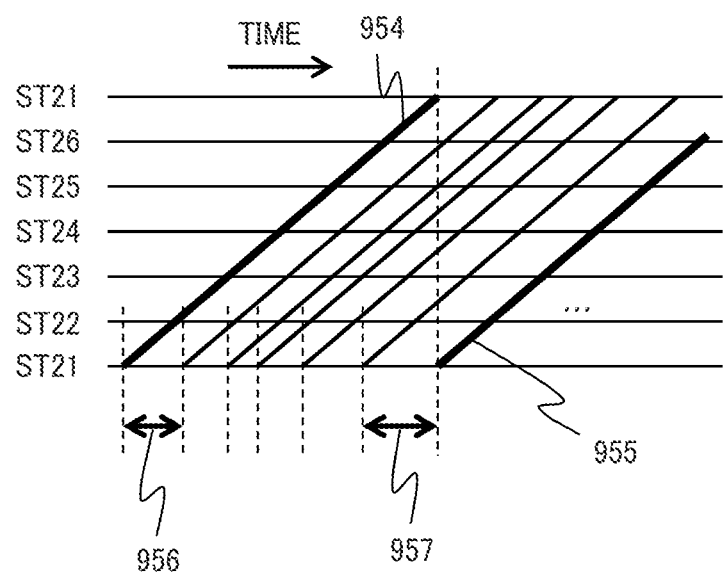
FIG. 24 is a diagram explaining a feature of an operation headway adjustment in the case where the railroad line pattern is a loop.

FIG. 23 is a diagram illustrating an example of a loop line according to this embodiment. As illustrated in FIG. 23, in this loop line, trains 953 running along an outer track LN21 circulate clockwise to each of stations ST21, ST22, . . . , and ST26 in this order while trains running along an inner track LN22 circulate counterclockwise to each of the stations (illustration of the trains running counterclockwise is omitted). FIG. 24 is a timetable diagram illustrating the operational situation of trains operating in such a loop line. As illustrated in FIG. 24, if the departure time of a train 954 is delayed to shorten an operation headway 956 to the next train, it may also cause a delay in the departure time of a train 955 that operates using the same vehicle as the train 954, which may extend an operation headway 957 to the preceding train. Thus, one feature of a loop line is that the effect of changing the time of one train is not limited to a change in operation headway to the train immediately after it. Also, another feature of a loop line is that there is no turnaround of trains and therefore no operation headway can be adjusted with a turnaround time. With these facts taken into consideration, the target timetable creation apparatus 100a in this embodiment differs from the target timetable creation apparatus 100 in the above-described first embodiment mainly in the contents of the process of step s117 in the headway adjustment process s93 (the process of creating constraint conditions for the running of trains). Hence, in the following, the contents of this process will be described in detail.

In the process of step s117, the target timetable creation apparatus in this embodiment creates constraint conditions as below by easing the condition 2 in the first embodiment into a condition 2', deleting the condition 3, and adding a condition 7 as a constraint condition for the train operation service, in order to keep inconvenience for passengers such as an increase in travel time (the time taken to arrive at a destination after departing from an origin) within a predetermined range with the above two features of a loop line taken into account.

(Condition 1) The running time of each train between each pair of adjacent stations after the headway adjustment is equal to the original running time before the headway adjustment.

(Condition 2') The dwell time of each train at each station after the headway adjustment is longer than or equal to the dwell time before the headway adjustment but the difference between them must be a predetermined time or shorter.

(Condition 4) The arrival time of the subsequent train of each train at each station after the headway adjustment is "departure time of preceding train+minimum headway" or later.

(Condition 5) The arrival or departure time of the subsequent train of each train at each station after the headway adjustment is "departure or arrival time of preceding train+junction margin" or later.

(Condition 6) The departure intervals of trains at each station after the headway adjustment is a preset maximum wait time or shorter.

(Condition 7) The travel time taken to make one trip around the railroad line is a predetermined time or shorter.

As described above, according to this embodiment, by creating a constraint condition by easing the dwell time condition so as to allow a change from the planned value, it is possible to make an operation headway adjustment according to a predicted passenger demand even for a loop line, for which it is difficult to make a headway adjustment with a turnaround time. It is therefore possible to create a train timetable (target timetable) in which the congestion rate of each train is equalized as in the first embodiment.

Third Embodiment

Figure 25:
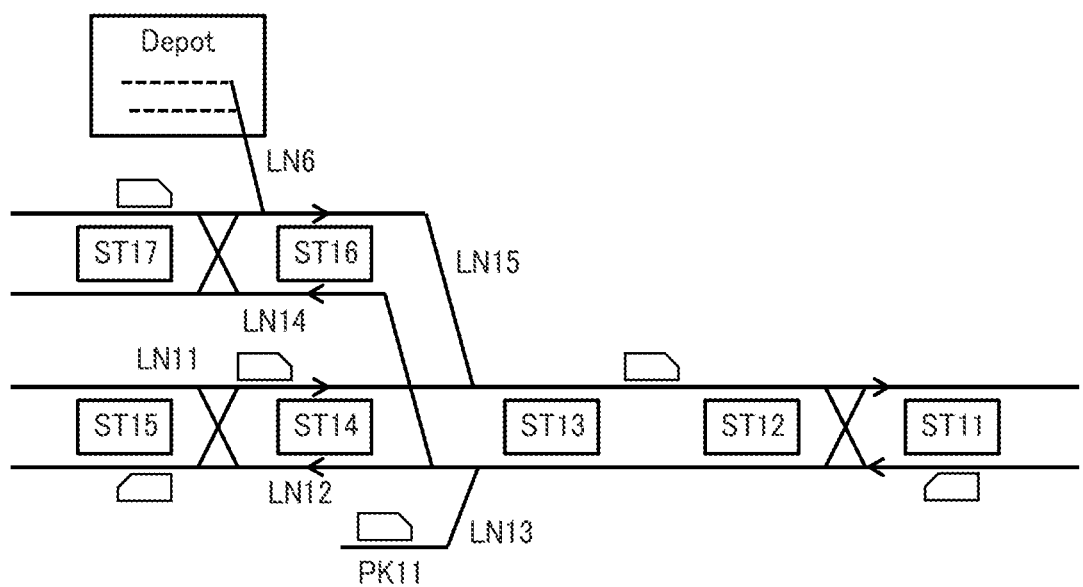
FIG. 25 is a diagram illustrating an example of a railroad line to which a third embodiment is preferably applicable.

A third embodiment of the present invention will be described below by using FIGS. 25 to 28. This embodiment is an example preferably applicable to a case where, as illustrated in FIG. 25, a railroad line in charge of one course and a railroad line in charge of another course share the same track and platforms in some section. This embodiment is also an example of a process of equalizing the congestion rate by means of a simple headway adjustment in order to prioritize the responsiveness of the timetable creation, when the operation density is high and the passenger demand in each course can be considered substantially uniform in the headway adjustment range. A target timetable creation apparatus 100c (not illustrated) in this embodiment differs from the target timetable creation apparatus 100 in the above-described first embodiment in the contents of the headway adjustment process s93. Thus, the contents of the headway adjustment process in this embodiment will be described in detail below.

FIG. 25 is a railroad line diagram explaining features of a railroad line to which this embodiment is preferably applicable. In this embodiment, a first railroad line in charge of a first course is a railroad line for shuttle operation for a series of stations ST11, ST12, ST13, ST14, and ST15, while a second railroad line in charge of a second course is a railroad line for shuttle operation for a series of stations ST11, ST12, ST13, ST16, and ST17. As illustrated in FIG. 25, the first and second railroad lines share the same equipment such as the tracks and platforms from the station ST11 through the station ST12 to the point past the station ST13 at which they separate from each other. Also, the same vehicle is arranged to be capable of running in both the first and second railroad lines. The vehicles to be used in these railroad lines share the same depot (Depot) which trains enter and exit via a track LN6.

Figure 26A:
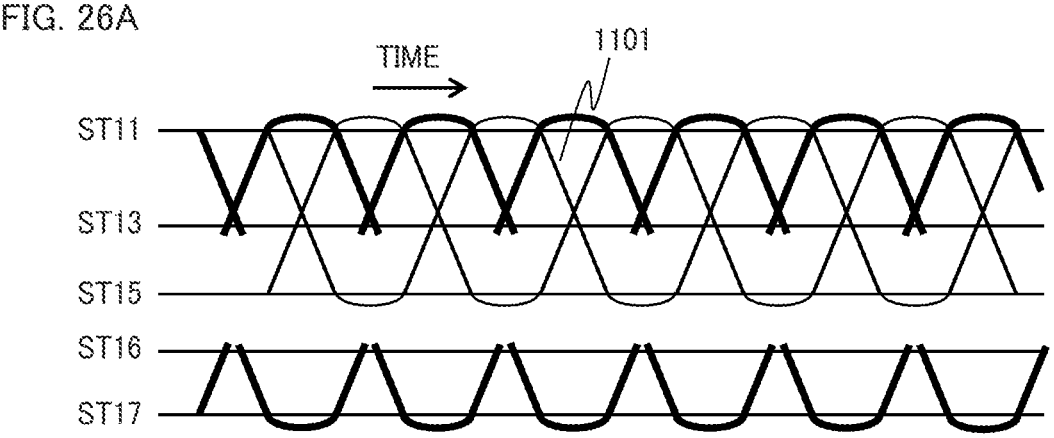
FIG. 26 is a diagram explaining operations in a candidate timetable creation process in the third embodiment, with (A) being a timetable diagram illustrating the state of a train timetable before execution of a combination element reflection process and (B) being a timetable diagram illustrating the state of the train timetable after the execution of the combination element reflection process.

FIG. 26(A) is a timetable diagram illustrating an example of the train timetable before the execution of the combination element reflection process s91 in this embodiment. The vertical axis represents the series of stations while the horizontal axis represents time, and the thin train lines represent trains that run in the first railroad line while the bold train lines represent trains that run in the second railroad line. In FIG. 26(A), a train line 1101, for example, is the train line of a train that runs in the first railroad line. Here, assume, for example, a case where the trains that run in the second railroad line are expected to be significantly higher in congestion rate than the trains that run in the first railroad line but there is no spare vehicle, and it is desired to decrease the number of trains that run in the first railroad line and increase the number of trains that run in the second railroad line.

Figure 26B:
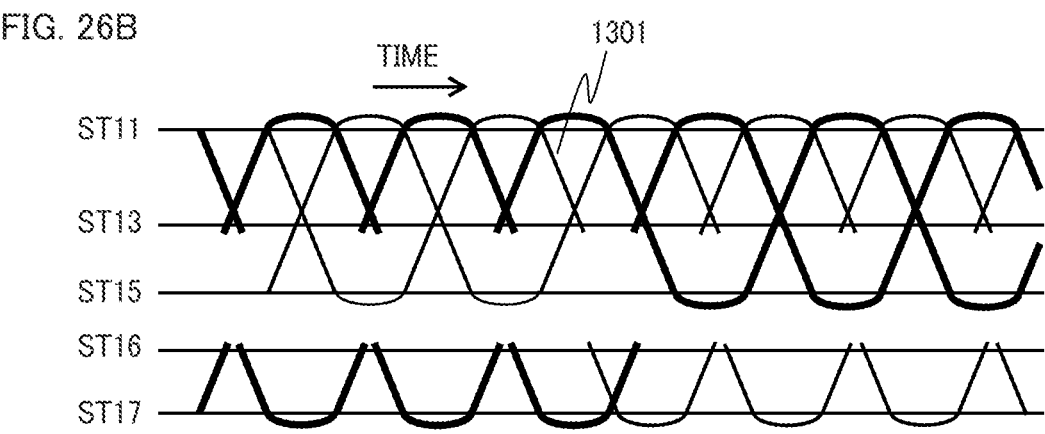

FIG. 26(B) is a timetable diagram illustrating an example of the train timetable after the execution of the combination element reflection process s91 in the above-assumed situation. In the train timetable illustrated in FIG. 26(B), the course of the train corresponding to the train line 1101 in FIG. 26(A) is changed such that the train runs in the second railroad line as indicated by a train line 1301, and subsequent trains are caused to run while changing their courses. This makes it possible to decrease the number of trains that run in the first railroad line and increase the number of trains that run in the second railroad line with all trains allocated their vehicles, that is, without "any trains that cannot be allocated their vehicles and cannot actually run". Such changes of combination elements may be made based on the timetable change pattern 291 stored in the timetable change pattern database 290, as in the first embodiment. Since the characteristic feature of this embodiment is the headway adjustment process s93, as mentioned above, details of the headway adjustment process will be described next using FIGS. 27 and 28.

Figure 27A:
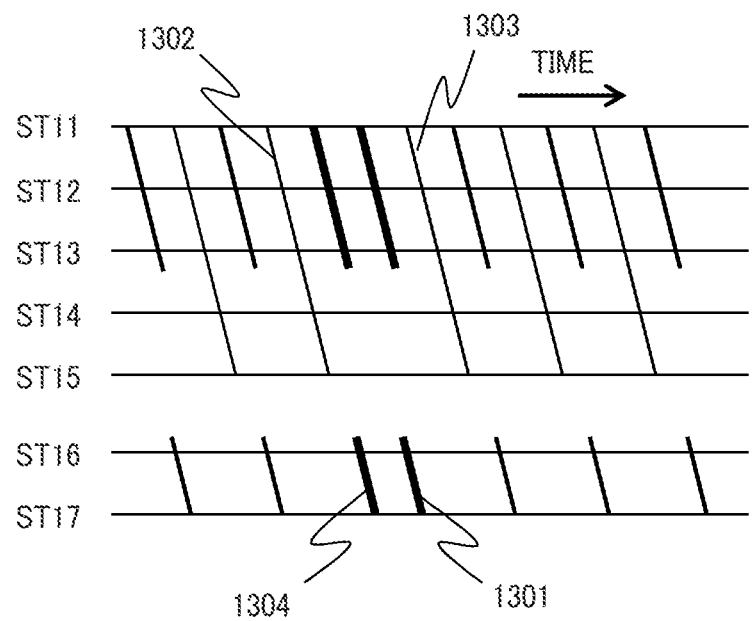
FIG. 27 is a diagram explaining operations in the candidate timetable creation process in the third embodiment, with (A) being a timetable diagram illustrating the state of a train timetable after execution of a headway adjustment process on the train timetable in the state of FIG. 26(B) without the destinations of the trains taken into account and (B) being a timetable diagram illustrating the state of a train timetable after execution of a headway adjustment process on the train timetable in the state of FIG. 26(B) with the destinations of the trains taken into account.
Figure 27B:
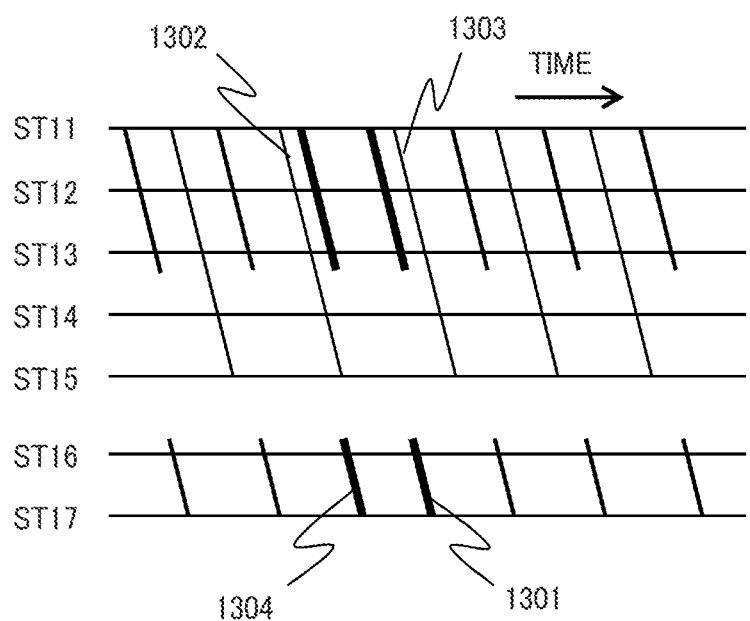

In FIGS. 27(A) and 27(B), unlike the train timetable illustrated in FIG. 26(B), illustration of train lines expressed with straight lines extending diagonally upward toward the right is omitted, and the train lines in portions where the operation density is raised are represented with bold lines and compared, in order to comprehensibly explain the characteristic feature of the headway adjustment process in this embodiment. Here, FIG. 27(A) is a timetable diagram in a case of selecting the trains corresponding to train lines 1301, 1302, 1303, and 1304 as headway adjustment target trains and performing a headway adjustment such that the operation headways of the trains in the section from ST11 to ST13, which is the section with the largest number of passengers, are at equal intervals, under a condition that "the headways of each bold train line and the single train lines immediately before and after it are adjustable (i.e., their times may be changed)". FIG. 27(B) is a timetable diagram in a case of performing a headway adjustment under the same condition such that the operation headways of the trains in the separated sections from ST14 to ST15 and from ST16 to ST17 are at equal intervals. If the passenger demand can be considered substantially uniform within the headway adjustment range, i.e., if, in the case of the example of FIG. 21, the curve 808 can be approximated with a straight line parallel to the horizontal axis, the congestion rate of each train has a greater tendency to be uniform when the operation headways are changed to be at equal intervals than when the operation headways are changed to be at unequal intervals. Thus, FIG. 27(A) can be summarized as a case of optimizing the operation headways focusing on the section with the largest number of passengers, while FIG. 27(B) can be summarized as a case of optimizing the operation headways on a destination basis.

The approach of FIG. 27(A), which optimizes the operation headways focusing on the section with the largest number of passengers, is assumed to be preferred on an intuitive level. However, as a result of studies using some data, it also was found to a certain extent that the approach of FIG. 27(B) is more preferred than the approach of FIG. 27(A). Specifically, there occurs a phenomenon that the number of trains that run in the second railroad line has been increased but, among the trains that run in the second railroad line, each train with a long operation headway to its preceding train has a high congestion rate and each train with a short operation headway to its preceding train has a low congestion rate. This is considered to originate from, for example, a passenger behavior model in which passengers attempting to take a train from the section from ST11 to ST13 to a station, as the destination, that can be reached only by the second railroad line do not get on a train running in the first railroad line but wait for a train running in the second railroad line, and is also considered to be likely to be passengers' behavior in the real world. From this finding, in this embodiment, when an objective function for headway adjustment is created in step s155 to be described later, the objective function is created with each train's destination taken into account as well.

Figure 28:
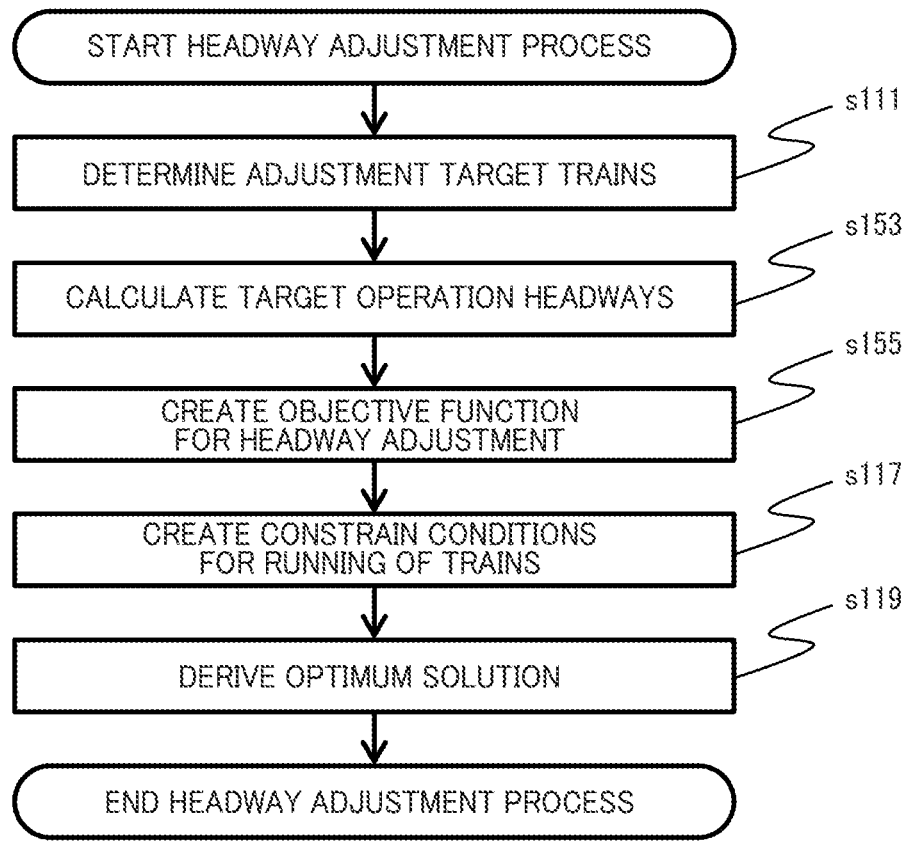
FIG. 28 is a flowchart explaining specific operations in the headway adjustment process among the operations of the target timetable creation apparatus in the third embodiment.

FIG. 28 is a flowchart explaining specific operations in the headway adjustment process among the operations of the target timetable creation apparatus 100c in this embodiment. The same reference signs in FIG. 28 as those in FIG. 20 denote the same things as those in FIG. 20. The headway adjustment process in FIG. 28 differs from the headway adjustment process in FIG. 20 in the process s153 of calculating target operation headways and the process s155 of creating an objective function for the headway adjustment. Of these, the process of step s153, as described earlier, employs a simple method involving an approximation such that "the operation headways are best changed to be at equal intervals" on the assumption that the passenger demand can be considered substantially uniform in the headway adjustment range. Thus, in the following, the process of step s155 will be described in detail.

When creating the objective function for the headway adjustment, the target timetable creation apparatus 100c in this embodiment creates the objective function with each train's operation route taken into account. Specifically, an objective function f3 as below, for example, is created by using HDW#SM(TRi, STj) to be described later instead of HDW(TRi, STj) in order to reflect intentions that "it is desirable to minimize the change in the operation headway between trains running in the same operation route" and "if an ideal situation cannot be achieved, it is desirable to bring a section with congestion into an ideal situation in priority". As in the first embodiment, an optimal solution is derived on the assumption that a solution that minimizes the objective function f3 is the best solution.

Objective function f3=Σ{CNG(TRi, STj)×
|HDW#SM(TRi, STj)−HDW#SM(PREV#SM
(TRi, STj), STj)|}

Here, while Σ represents a summation for pairs of an adjustment target train TRi and a train of interest STj, they are summation targets only if the adjustment target train TRi runs to and from the station of interest STj. Note that there is usually one or more values for the suffix i in the adjustment target train TRi (i.e., one or more train are adjustment targets), and also there is usually one or more values for the suffix j in the station of interest STj (e.g., focusing on a plurality of stations, such as ST14 and ST16, is allowed). Note that each station STj may be weighted according to its importance.

Also, CNG(TRi, STj) represents the per-train average occupancy rate of the trains in the same operation route as the train TRi at the time of departure from the station STj in a time period ranging from the departure time of the train TRi at the station STj to points before and after it (for example, a given parameter is stored in the storage unit 103 in advance and the target range is identified by referring to this parameter).

HDW#SM(TRi, STj) represents the operation headway of a train in the same operation route at the station STj, the operation headway being based on the train TRi. Specifically, it is represented by the following equation. Note that NEXT#SM(TRi, STj) in the equation represents the next train at the station STj immediately following the train TRi among the trains in the same operation route as the train TRi.

HDW#SM(TRi, STj)=DPT(NEXT#SM(TRi), STj)−
DPT(TRi, STj)

PREV#SM(TRi, STj) represents the previous train at the station STj immediately preceding the train TRi among the trains in the same operation route as the train TRi.

As describe above, the automatic train control system 1 in this embodiment creates an objective function by using operation headways taking the operation routes of trains into account. Thus, in the case where a railroad line in charge of one course and a railroad line in charge of another course share the same track or platform in some section, the congestion rate of each train can be equalized even if the courses differ in the degree of passenger demand. Also, in the case where the operation density is high and the passenger demand in each course can be considered substantially uniform in the headway adjustment range, an approximation is performed in the calculation of the target operation headways such that the operation headways are better changed to be at equal intervals. This can simplify the headway adjustment process and improve the responsiveness of the timetable creation.

A plurality of embodiments of the present invention have been described above. However, embodiments of the present invention are not limited to those exemplarily described, and various changes can be made without departing from the gist of the invention.

For example, in the above-described embodiments, the constraint conditions are created in the headway adjustment process such that the running times and the dwell times after the headway adjustment will be the same values as the original running times and dwell times in the planning stage. However, embodiments of the present invention are not limited to this, and constraint conditions that allow the times to be longer within predetermined value ranges may be created. In this case, as a constraint condition for the train operation service, it is desirable to additionally create, for example, a constraint condition that instructs the maximum value of the travel time from a starting station to a terminal station to be a predetermined value or less to thereby limit the degree of inconvenience that may occur to passengers.

Also, in the above-described embodiments, the automatic train control system 1 is configured to include the passenger demand prediction system 300, but embodiments of the present invention are not limited to this. The configuration only needs to be such that the target timetable creation apparatus 100 can obtain a predicted passenger demand from the passenger demand prediction system 300 when necessary. For example, the configuration may be such that the target timetable creation apparatus 100 transmits a request via a publicly available interface to the passenger demand prediction system 300 located outside the automatic train control system 1 and obtains a predicted passenger demand therefrom.

Also, in the above-described embodiments, the operation route information 1200 is configured to include platform IDs as identifiers of platforms to be used at stations. However, embodiments of the present invention are not limited to this. For example, the configuration may be such that a program automatically figures out platforms to be used at termini such as a starting station and a terminal station, and platform IDs corresponding to such stations may be expressed with a marker, such as "*".

Also, the above-described embodiments have been described by taking, as an example, a control system for implementing a railroad transport service. However, embodiments of the present invention are not limited to this, and are widely applicable to transportations such as LRT (Light Rail Transit) and bus that run along a predetermined route based on a schedule.

As described above, in the above-described embodiments, the target timetable creation apparatus 100 is configured such that the objective function generation unit generates a function, as an objective function for headway adjustment, that gives an evaluation value which gets worse the greater the difference of the operation headway between trains in the same operation route.

In this way, when, for example, a railroad line in charge of one course and a railroad line in charge of another course share the same track or platform in some section, it is possible to perform a headway adjustment that temporally equalizes the transport capacity in each course with the passenger demand in each course taken into account. As a result, according to findings obtained by the present inventor, the congestion rates of the trains in each railroad line as a whole can be more effectively equalized.

Also, in the above-described embodiments, the target timetable creation apparatus 100 is configured such that it includes a target operation headway calculation unit that calculates an ideal value of the operation headway between trains by using the predicted passenger demand, the objective function generation unit generates a function, as the objective function for headway adjustment, that gives an evaluation value which gets worse the farther the operation headway between the trains deviates from the ideal value, and the target timetable creation apparatus 100 optimizes the objective function under constraint conditions generated by a constraint condition generation unit to thereby derive an optimal headway adjustment result.

With such a configuration, when it is possible to implement operation headways that are ideal based on the passenger demand, a train timetable that implements the ideal operation headways can be created. Even when it is impossible to implement the ideal operation headways, a train timetable that implements closest possible operation headways to the ideal operation headways can be created. Accordingly, it is possible to provide a train operation service to passengers with a more uniform quality than conventional techniques when the passenger demand varies.

Also, in the above-described embodiments, the configuration is such that the constraint condition generation unit generates the constraint conditions for the headway adjustment such that the value of the dwell time of each train at a predetermined station is changeable within a predetermined range, and the target timetable creation apparatus derives an optimal solution under these constraint conditions.

With such a configuration, the operation headways can be appropriately adjusted so as to be close to the ideal operation headways even in the case of a railroad line in which an adjustment cannot be made using a turnaround time, such a loop railroad line.

Also, in the above-described embodiments, the configuration is such that the target timetable creation apparatus 100 includes an evaluation index value calculation unit that calculates an evaluation index value of a train timetable. Further, a candidate timetable creation unit generates a plurality of candidate timetables as candidates for a new target timetable, the evaluation index value calculation unit calculates an evaluation index value of each of the plurality of candidate timetables, and the timetable creation apparatus identifies the candidate timetable with the evaluation index value among the calculated evaluation index values that has the highest similarity to a predetermined reference value as the best candidate timetable among the plurality of candidate timetables, and outputs the identified best candidate timetable as a new target timetable.

With such a configuration, a candidate timetable expected to provide a service quality close to a reference service quality can be selected as a new target timetable. Accordingly, a train operation service with a uniform quality can be provided without turning into an excessive service or an insufficient service.

For example, with an evaluation index vector, a candidate timetable close to the train operation service quality estimated in the original timetable plan can be determined as being good. Accordingly, a train operation service with a quality similar to the normal state can be provided without turning into an excessive service as a result of frequently adding an extra train.

Also, in the above-described embodiments, the configuration is such that the timetable creation apparatus 100, further comprises an evaluation index value calculation unit that calculates an evaluation index value of a train timetable, wherein the evaluation index value calculation unit calculates an evaluation index value of the target timetable before correction, and if a predetermined difference is detected as a result of comparing the calculated evaluation index value and a predetermined reference value, the timetable creation apparatus generates the candidate timetable.

With such a configuration, the train timetable can be changed only when the predicted service quality significantly deviates from the predetermined reference value, and therefore its impact on other schedules such as the vehicle maintenance schedule can be reduced.

Also, in the above-described embodiments, the configuration is such that, as the predetermined reference value for identifying the best candidate timetable among the plurality of candidate timetables, an evaluation index value is used which is calculated based on a train timetable planned on the same day before execution of correction and the passenger demand estimated at the time of creating this train timetable.

With such a configuration, even when the passenger demand varies, it is possible to stably provide a service with a quality close to the service quality estimated by the person who created the transport plan.

Also, in the above-described embodiments, the configuration is such that the evaluation index value includes the number of left-behind passengers at a predetermined station as an element of the evaluation index value.

With such a configuration, it is possible to provide a service in which not only each train's predicted congestion rate but also each station's predicted situation are uniform.

Also, in the above-described embodiments, the configuration is such that the evaluation index value includes, as an element of the evaluation index value, a value on an average congestion rate of trains in each predetermined time period derived using a window function.

With such a configuration, even when the presence or absence of trains around the boundaries of a predetermined timetable period changes in response to a timetable change, it is possible to appropriately keep track of the change in average congestion rate in each time period and identify an appropriate candidate timetable as the best candidate timetable.

Also, in the above-described embodiments, the configuration is such that the automatic train control system includes a timetable creation apparatus which includes an objective function generation unit that generates an objective function for an operation headway between trains included in a group of trains being control targets by using a predicted passenger demand calculated based on information obtained from a predetermined sensor, a constraint condition generation unit that derives constraint conditions which an arrival time and a departure time of each of the trains at each of stations should satisfy for operation of the group of trains, and a candidate timetable creation unit that creates a candidate timetable as a candidate for a target timetable being a train timetable to be used to control the group of trains, by using an arrival time and a departure time of each of the trains at each of the stations derived by optimizing the objective function under the constraint conditions, and which outputs the candidate timetable created based on the latest target timetable by the candidate timetable creation unit as a new target timetable, and the automatic train control system controls each of the trains based on the output target timetable.

With such a configuration, it is possible to implement a train operation capable of uniformly providing a comfortable train operation service to passengers while keeping track of the passenger usage.

As described above, the automatic train control system 1 is capable of dynamically adjusting the operation headway of each train according to the increase/decrease in passenger demand and, in particular, of correcting a target timetable (timetable) being an operation plan of each train according to the increase/decrease in passenger demand. The automatic train control system 1 is therefore capable of controlling the trains such that they run according to the corrected target timetable.

Also, the automatic train control system 1 is capable of creating a timetable whose degree of match with the passenger demand is appropriately adjusted (e.g., a train timetable in which operation headways are appropriately equalized) even in cases such as when it is physically impossible to achieve an ideal state for matching with the passenger demand, when the railroad line has a branching-merging point, and when the railroad line is a loop line. In this way, it is possible to provide a train operation service that matches with the passenger demand and is equalized.

Reference Signs List

1 Automatic train control system
100 Target timetable creation apparatus
115 Objective function generation unit
117 Constraint condition generation unit
119 Candidate timetable creation unit

The invention claimed is:

1. A timetable creation apparatus for correcting a target timetable, used in a traffic management system that is configured to receive the target timetable created by the timetable creation apparatus and configured to control a group of vehicles automatically based on the target timetable, by using a predicted passenger demand for each of the vehicles to thereby create a new target timetable used in the traffic management system, comprising:
    a hardware processor; and
    a non-transitory computer readable storage media operatively coupled with the hardware processor, and storing program instructions executed by the hardware processor, the program instructions causing the timetable creation apparatus to:
    determine whether any vehicles need to be deleted from or added to the target timetable, and automatically deleting vehicles from and adding vehicles to the target timetable and the group based on the determination;
    generate an objective function for an operation headway between vehicles included in the group of vehicles by using the predicted passenger demand in order to equalize a number of passengers allocated to each departure time of each of the vehicles;
    derive first constraint conditions including an arrival time and a departure time of each of the vehicles at each of the stations to satisfy operability of the group of vehicles and second constraint conditions including an arrival time and a departure time of each of the vehicles at each of the stations to satisfy a predetermined operation service quality as a result of predicting an operational situation of the group of vehicles in a predetermined future time range; and
    create a candidate timetable as a candidate for the target timetable including an optimum value of an arrival time and an optimum value of a departure time of each of the vehicles at each of the stations derived by optimizing the objective function under the first constraint conditions and the second constraint condition,
    wherein the timetable creation apparatus updates the target timetable used in the traffic management system that is configured to control a group of vehicles automatically based on the target timetable by transmitting the candidate timetable to the traffic management system as the new target timetable in order for the traffic management system to control movement of the group of vehicles by outputting control signals to the vehicles based on the new target timetable, in which the number of passengers allocated to each departure time of each of the vehicles is equalized based on the predicted passenger demand;
    wherein the vehicles include at least one of a railroad vehicle, a bus vehicle, or a Light Rail Transit vehicle which runs along a predetermined route based on the timetable.

2. The timetable creation apparatus according to claim 1, wherein the objective function gives an evaluation value which gets worse as a difference of an operation headway between vehicles in a same operation route becomes greater.

3. The timetable creation apparatus according to claim 1, wherein the program instructions cause the timetable creation apparatus to calculate an ideal value of the operation headway between vehicles by using the predicted passenger demand, and
    generate a function, as the objective function, that gives an evaluation value which gets worse the farther the operation headway between the vehicles deviates from the calculated ideal value.

4. The timetable creation apparatus according to claim 3, wherein the program instructions cause the timetable creation apparatus to derive the constraint conditions such that a value of a dwell time of each of the vehicles at a predetermined station is changeable within a predetermined range.

5. The timetable creation apparatus according to claim 1, wherein the program instructions cause the timetable creation apparatus to:
calculate an evaluation index vector of a timetable,
generate a plurality of the candidate timetables,
calculate an evaluation index vector of each of the plurality of the candidate timetables, and
identify the candidate timetable with the evaluation index vector that has highest similarity to a predetermined reference value among the calculated evaluation index vector as a best candidate timetable among the plurality of the candidate timetables, and outputs the identified best candidate timetable as the new target timetable.

6. The timetable creation apparatus according to claim 5, wherein the predetermined reference vector is an evaluation index vector calculated based on a timetable in a planning stage before correction, and a passenger demand estimated when the timetable was created.

7. The timetable creation apparatus according to claim 5, wherein the evaluation index vector includes the number of left-behind passengers at a predetermined station as an element of the evaluation index vector.

8. The timetable creation apparatus according to claim 5, wherein the evaluation index vector includes a value on an average congestion rate of vehicles in each of predetermined time periods calculated using a window function as an element of the evaluation index vector.

9. The timetable creation apparatus according to claim 1, wherein the program instructions cause the timetable creation apparatus to calculate an evaluation index vector of a timetable,
calculate an evaluation index vector of the target timetable before correction, and if a predetermined difference is detected as a result of comparing the calculated evaluation index vector and a predetermined reference value, the timetable creation apparatus generates the candidate timetable.

10. The timetable creation apparatus according to claim 1, wherein the timetable creation apparatus generates an objective function for an operation headway between vehicles included in the group of vehicles by using the predicted passenger demand and information for a destination of each vehicle included in the group of vehicles.

11. The timetable creation apparatus according to claim 1, further comprising:
a timetable change pattern database containing timetable change patterns that have been preset regarding how to change the timetable and that include information about a previous operation service and a subsequent operation service to be linked to a vehicle in charge of a service before a timetable change and information about the previous operation service and the subsequent operation service to be linked to a vehicle in charge of a service after a timetable change;
wherein the program instructions cause the timetable creation apparatus to:
create a temporary timetable by changing a combination of constituent elements by using a timetable change pattern contained in the timetable change pattern database,
generate an objective function based on the temporary timetable;
derive the first constraint conditions and the second constraint conditions based on the temporary timetable; and
wherein the timetable creation apparatus is configured to create a new candidate timetable for each timetable change pattern stored in the timetable change pattern database, and select a best candidate timetable among the new candidate timetables and transmit the best candidate timetable as the new target timetable.

12. A timetable creation method of correcting a target timetable, used in a traffic management system that is configured to receive the target timetable created by a timetable creation apparatus and configured to control a group of vehicles automatically based on the target timetable, by using a predicted passenger demand for each of the vehicles to thereby create a new target timetable used in the traffic management system, comprising causing the timetable creation apparatus to execute:
determining whether any vehicles need to be deleted from or added to the target timetable, and automatically deleting vehicles from and adding vehicles to the target timetable and the group based on the determination;
an objective function generation process of generating an objective function for an operation headway between vehicles included in the group of vehicles by using the predicted passenger demand in order to equalize a number of passengers allocated to each departure time of each of the vehicles;
a constraint condition generation process of deriving first constraint conditions including an arrival time and a departure time of each of the vehicles at each of the stations to satisfy operability of the group of vehicles and second constraint conditions including an arrival time and a departure time of each of the vehicles at each of the stations to satisfy a predetermined operation service quality as a result of predicting an operational situation of the group of vehicles in a predetermined future time range; and
a candidate timetable creation process of creating a candidate timetable as a candidate for the target timetable including an optimum value of an arrival time and an optimum value of a departure time of each of the vehicles at each of the stations derived by optimizing the objective function under the first constraint conditions and the second constraint conditions, and
to update the target timetable used in the traffic management system that is configured to control a group of vehicles automatically based on the target timetable by transmitting the candidate timetable created by the candidate timetable creation process to the traffic management system as the new target timetable in order for the traffic management system to control movement of the group of vehicles by outputting control signals to the vehicles based on the new target timetable, in which the number of passengers allocated to each departure time of each of the vehicles is equalized based on the predicted passenger demand;
wherein the vehicles include at least one of a railroad vehicle, a bus vehicle, or a Light Rail Transit vehicle which runs along a predetermined route based on the timetable.

13. The timetable creation method according to claim 12, wherein
the timetable creation apparatus generates an objective function for an operation headway between vehicles included in the group of vehicles by using the predicted passenger demand and information for a destination of each vehicle included in the group of vehicles in the objective function generation process.

14. The timetable creation method according to claim 12, wherein the timetable creation apparatus:
- further comprises a timetable change pattern database containing timetable change patterns that have been preset regarding how to change the timetable and that include information about a previous operation service and a subsequent operation service to be linked to a vehicle in charge of a service before a timetable change and information about the previous operation service and the subsequent operation service to be linked to a vehicle in charge of a service after a timetable change;
- creates a temporary timetable by changing a combination of constituent elements by using a timetable change pattern contained in the timetable change pattern database;
- generates an objective function based on the temporary timetable;
- derives the first constraint conditions and the second constraint conditions based on the temporary timetable;
- creates a new candidate timetable for each timetable change pattern stored in the timetable change pattern database; and
- selects a best candidate timetable among the new candidate timetables and updates the target timetable.

* * * * *